US011929578B2

(12) United States Patent
Tseng et al.

(10) Patent No.: US 11,929,578 B2
(45) Date of Patent: Mar. 12, 2024

(54) ELECTRICAL CONNECTION DEVICE WITH INSERTION PROTECTION STRUCTURE

(71) Applicant: Molex, LLC, Lisle, IL (US)

(72) Inventors: Ting-Chang Tseng, New Taipei (TW); Wei-Che Sun, New Taipei (TW)

(73) Assignee: Molex, LLC, Lisle, IL (US)

( * ) Notice: Subject to any disclaimer, the term of this patent is extended or adjusted under 35 U.S.C. 154(b) by 103 days.

(21) Appl. No.: 17/552,449

(22) Filed: Dec. 16, 2021

(65) Prior Publication Data

US 2022/0200208 A1 Jun. 23, 2022

(30) Foreign Application Priority Data

Dec. 22, 2020 (CN) ......................... 202023118936.4

(51) Int. Cl.

| | |
|---|---|
| ***H01R 13/64*** | (2006.01) |
| ***H01R 12/71*** | (2011.01) |
| ***H01R 13/516*** | (2006.01) |
| ***H01R 13/627*** | (2006.01) |
| ***H01R 13/631*** | (2006.01) |
| *H01R 12/75* | (2011.01) |
| *H01R 13/62* | (2006.01) |
| *H01R 13/629* | (2006.01) |
| *H01R 13/6594* | (2011.01) |
| *H01R 24/60* | (2011.01) |

(52) U.S. Cl.

CPC ........... *H01R 13/64* (2013.01); *H01R 12/716* (2013.01); *H01R 13/516* (2013.01); *H01R 13/6271* (2013.01); *H01R 13/631* (2013.01); *H01R 12/75* (2013.01); *H01R 13/62* (2013.01); *H01R 13/629* (2013.01); *H01R 13/6594* (2013.01); *H01R 24/60* (2013.01)

(58) Field of Classification Search

CPC .... H01R 13/64; H01R 12/716; H01R 13/516; H01R 13/6271; H01R 13/631; H01R 12/75; H01R 13/62; H01R 13/629; H01R 13/6594; H01R 24/60

See application file for complete search history.

(56) References Cited

U.S. PATENT DOCUMENTS 7,351,104 B2 4/2008 Neer et al.
8,834,197 B2 * 9/2014 Wu ........................ H01R 24/00 439/607.49

(Continued)

FOREIGN PATENT DOCUMENTS

CN 201478607 U 5/2010

*Primary Examiner* — Abdullah A Riyami
*Assistant Examiner* — Justin M Kratt

(57) ABSTRACT

An electrical connection device is provided and includes a cable-end connector and a board-end connector. The cable-end connector includes an insulative housing and a circuit board. The insulative housing includes a housing body and a mating plate, the housing body has a front end face, the mating plate has a front end portion. The board-end connector includes an insulative base, a plurality of terminals and a metal outer shell. A mating groove is formed between the metal outer shell and the insulative base and is used to allow the mating plate to mate therewith. One of the insulative base and the metal outer shell is provided with a protruding member and when the cable-end connector reversely inserts into the board-end connector, the protruding member stops the front end portion of the mating plate.

20 Claims, 21 Drawing Sheets

(56) References Cited

U.S. PATENT DOCUMENTS

| | | | | |
|---|---|---|---|---|
| 9,450,354 | B2 | 9/2016 | Little et al. | |
| 9,893,468 | B2 | 2/2018 | Zhao | |
| 2018/0205179 | A1* | 7/2018 | Zhou | H01R 12/57 |

* cited by examiner

ELECTRICAL CONNECTION DEVICE WITH INSERTION PROTECTION STRUCTURE

RELATED APPLICATIONS

This application claims priority to Chinese Patent application no. 202023118936.4, filed Dec. 22, 2020, and which is herein incorporated by reference in its entirety.

TECHNICAL FIELD

The present disclosure relates to an electrical connection device, and particularly relates to an electrical connection device which can prevent incorrect insertion.

BACKGROUND ART

Referring to FIG. 1 and FIG. 2, because there is no protective structure to prevent incorrect insertion of a cable-end connector 11 and a board-end connector 12 in an existing technique, in addition to that the cable-end connector 11 can properly insert into the board-end connector 12 as shown in FIG. 1, the cable-end connector 11 also can reversely insert into the board-end connector 12 after the cable-end connector 11 is rotated by 180 degrees as shown in FIG. 2, which results in that a user might easily incorrectly insert the cable-end connector 11 reversely.

Moreover, when the cable-end connector 11 properly inserts into the board-end connector 12, a metal outer shell 121 of the board-end connector 12 abuts against a body front end face 111 of the cable-end connector 11 only by an end edge 122 which is straight-line shaped, which thus cannot stably support the cable-end connector 11.

SUMMARY

Therefore, an object of the present disclosure is to provide an electrical connection device which can overcome at least one deficiency in the existing technique.

Accordingly, an electrical connection device of the present disclosure comprises a cable-end connector and a board-end connector. The cable-end connector comprises a housing, which may be made of insulative material, and a circuit board. The insulative housing comprises a housing body and a mating plate, the housing body has a front end face, the mating plate protrudes from the housing body and has a front end portion positioned in front of the front end face. The circuit board is supported by the housing body, partially protrudes relative to the front end face, and is spaced apart from the mating plate. The board-end connector comprises a base, which may be made of insulative material, a plurality of terminals, and a metal outer shell. The insulative base is formed with a mating slot which is used to allow the circuit board to mate therewith. The plurality of terminals are positioned in the insulative base and are used to electrically connect to the circuit board. The metal outer shell sheathes the insulative base, and a mating groove is formed between the metal outer shell and the insulative base and is used to allow the mating plate to mate therewith. One of the insulative base and the metal outer shell is provided with at least one protruding member protruding outwardly therefrom, when the cable-end connector properly inserts into the board-end connector, the cable-end connector mating with the board-end connector, and the protruding member abuts against the front end face of the housing body; when the cable-end connector reversely inserts into the board-end connector, the protruding member stops the front end portion of the mating plate so as to prevent the cable-end connector from mating with the board-end connector.

In some embodiments, the metal outer shell has an end plate, the protruding member is a hollow cage which protrudes outwardly from the end plate, and the protruding member has a stopping portion which is U-shaped and is used to abut against the front end face or stop the front end portion.

In some embodiments, the metal outer shell has an end plate, the protruding member is an upright plate which protrudes outwardly from the end plate, and the protruding member has a stopping portion which is elongated and is used to abut against the front end face or stop the front end portion.

In some embodiments, the metal outer shell has an end plate, the protruding member is a flat plate which protrudes outwardly from the end plate, and the protruding member has a stopping portion which is plane-shaped and is used to abut against the front end face or stop the front end portion.

In some embodiments, the insulative base has an end face, the protruding member is a protruding block which protrudes outwardly from the end face and protrudes outwardly relative to the metal outer shell, and the protruding member has a stopping portion which is plane-shaped and is used to abut against the front end face or stop the front end portion.

In some embodiments, the metal outer shell comprises an end plate, the end plate has an end edge which is used to abut against the front end face, the protruding member protrudes outwardly from the end plate and has a stopping portion which is flush with the end edge, and the stopping portion is used to abut against the front end face or stop the front end portion.

In some embodiments, the metal outer shell comprises an end edge which is used to abut against the front end face and the stopping portion is flush with the end edge.

In some embodiments, one of the insulative base and the metal outer shell is a provided with two protruding members which are spaced apart from each other, and an interval space is formed between the two protruding members.

In some embodiments, the insulative housing further comprises a guiding plate which protrudes from the housing body, the guiding plate is spaced apart from the circuit board and is positioned a side of the circuit board opposite to the mating plate, an interval between the two protruding members is larger than a length of the guiding plate, and when the cable-end connector properly inserts into the board-end connector, the guiding plate enters into the interval space.

In some embodiments, the insulative housing further comprises two side plates which protrude from the housing body, the mating plate is positioned between the two side plates, each side plate and the mating plate are spaced apart from each other, a gap is formed between each side plate and the mating plate, and when the mating plate mates with the mating groove, the two side plates are positioned outside the metal outer shell.

In some embodiments, the metal outer shell comprises a protruding frame, the protruding frame is U-shaped and has two side portions which are spaced apart from each other and a connecting portion which is connected between the two side portions, and when the cable-end connector properly inserts into the board-end connector, the two side portions respectively enter into the two gaps.

In some embodiments, the cable-end connector further comprises a latching member which is provided to the mating plate and is used to latch with the metal outer shell.

In some embodiments, the cable-end connector further comprises a plurality of cables which electrically connect to the circuit board.

The present disclosure at least has the following effect: the stopping portions of the protruding members of the board-end connector are flush with the end edge of the end plate, and the protruding members and the end edge can together support the front end face in the two dimensional plane space, and the cable-end connector can be stably supported when the cable-end connector properly inserts into the board-end connector. Moreover, the stopping portions of the protruding members can stop the front end portion of the cable-end connector, preventing a user from inserting the cable-end connector into the board-end connector in a reverse orientation. Moreover, the board-end connector is provided with protruding members as protective structure to prevent incorrect insertion, and manufacturing cost consumed to reform a mold to manufacture the cable-end connector having structure to prevent incorrect insertion can be saved.

BRIEF DESCRIPTION OF THE DRAWINGS

Other features and effects of the present disclosure will be apparent in an embodiment referring to the accompanying drawings in which.

DETAILED DESCRIPTION OF THE PREFERRED EMBODIMENTS

Figure 1:
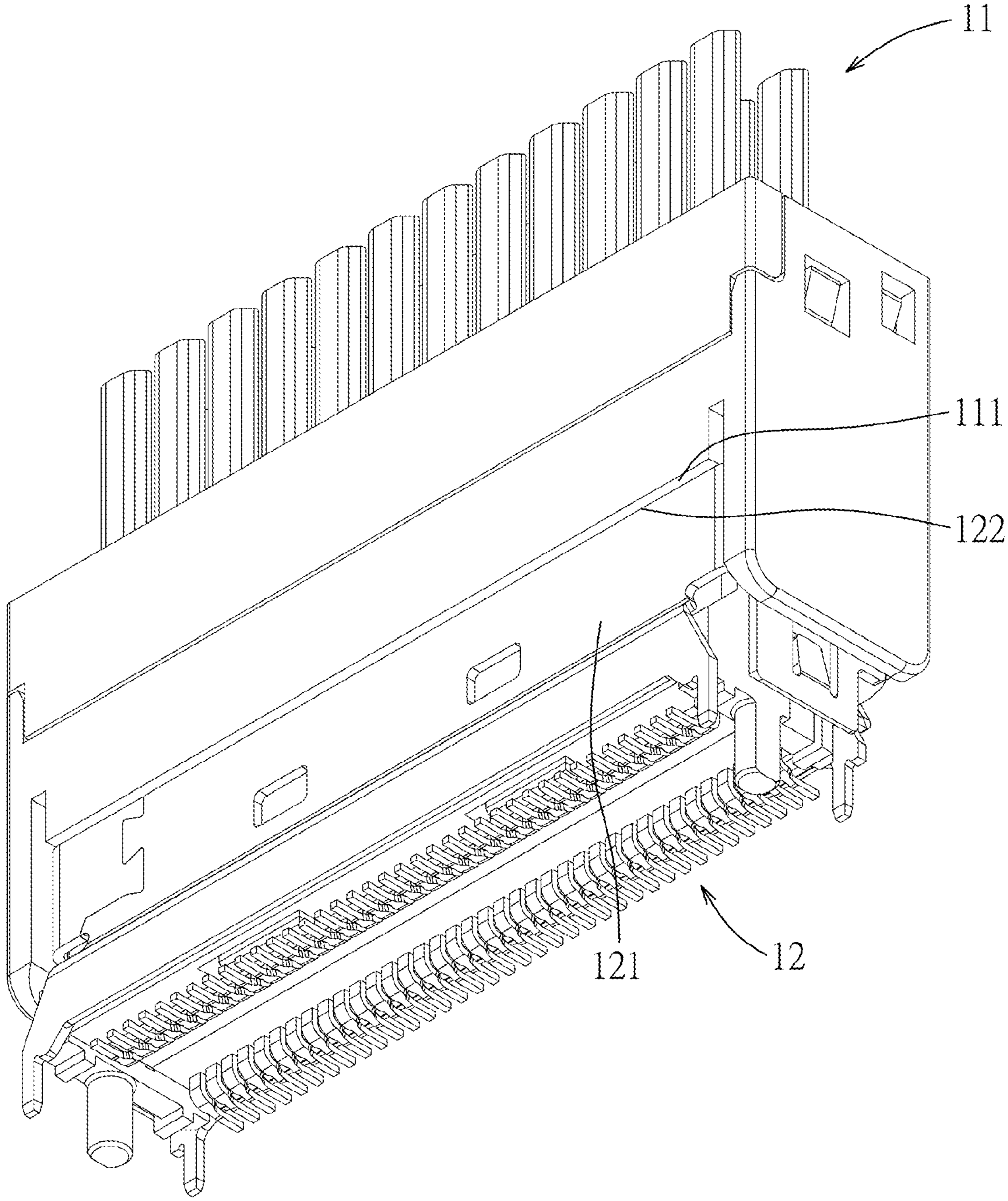
FIG. 1 (Prior Art)
FIG. 1 is a perspective view illustrating that a cable-end connector properly inserts into a board-end connector in an existing technique.
Figure 2:
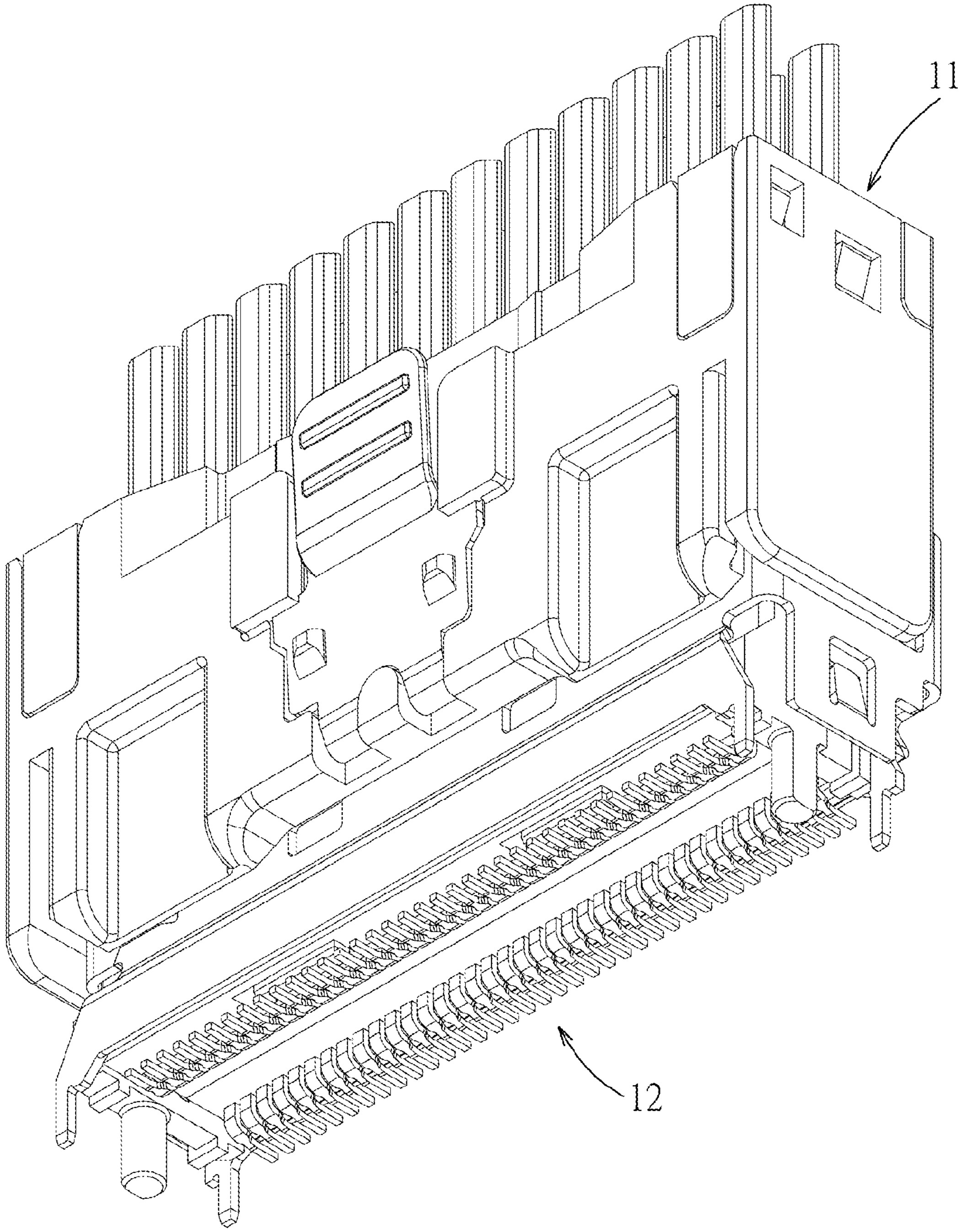
FIG. 2 (Prior Art)
FIG. 2 is a perspective view illustrating that the cable-end connector reversely inserts into the board-end connector in the existing technique.

Before the present disclosure is described in detail, it is noted that the similar components are indicated by the same reference numerals in the following description.

Figure 3:
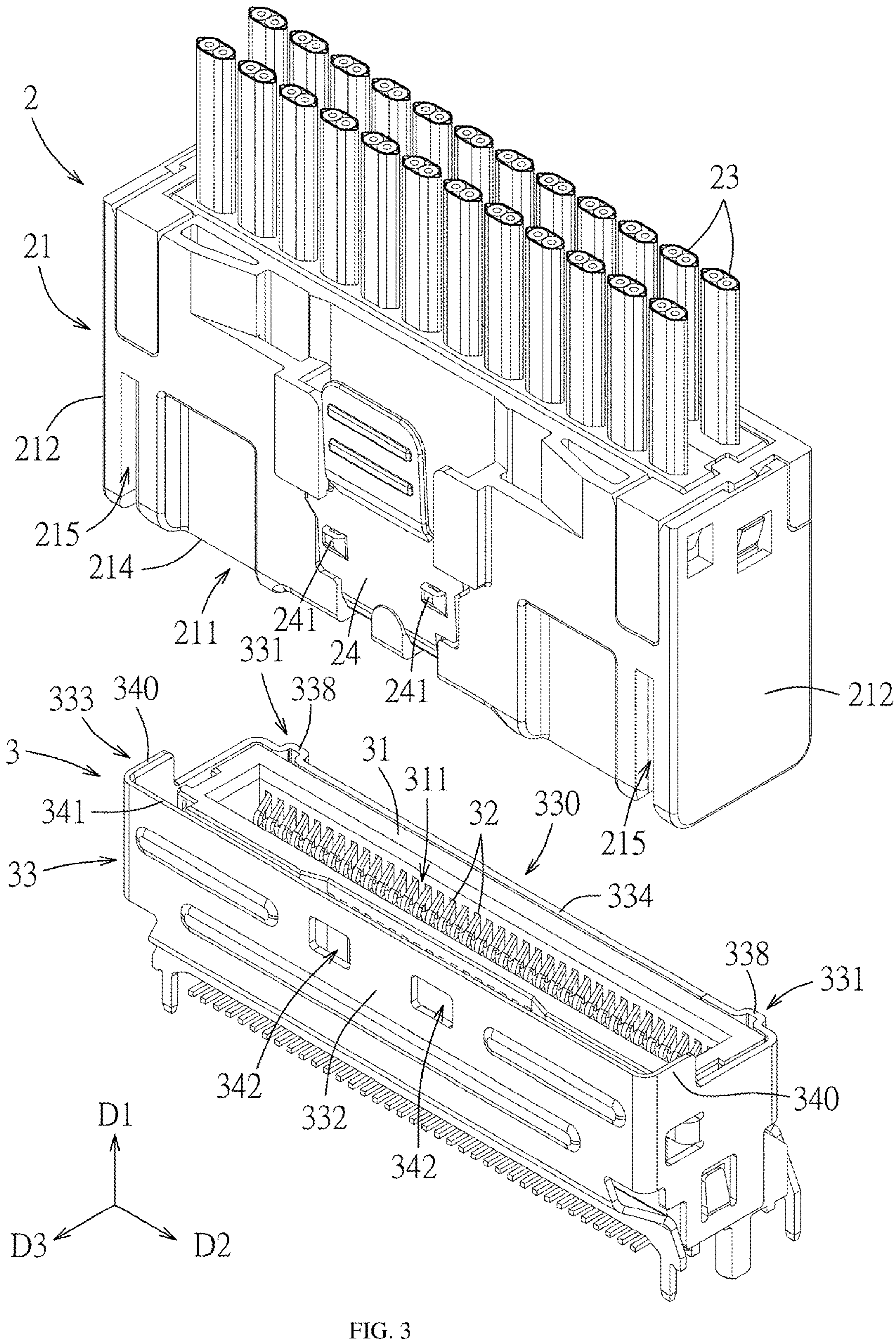
FIG. 3 is a perspective exploded view of a first embodiment of an electrical connection device of the present disclosure illustrating an assembling relationship between a cable-end connector and a board-end connector.

Referring to FIG. 3, a first embodiment of an electrical connection device of the present disclosure includes a cable-end connector 2 and a board-end connector 3. The cable-end connector 2 is a plug connector, the board-end connector 3 is a receptacle connector, the board-end connector 3 can mate with the cable-end connector 2 along a height direction D1.

Figure 4:
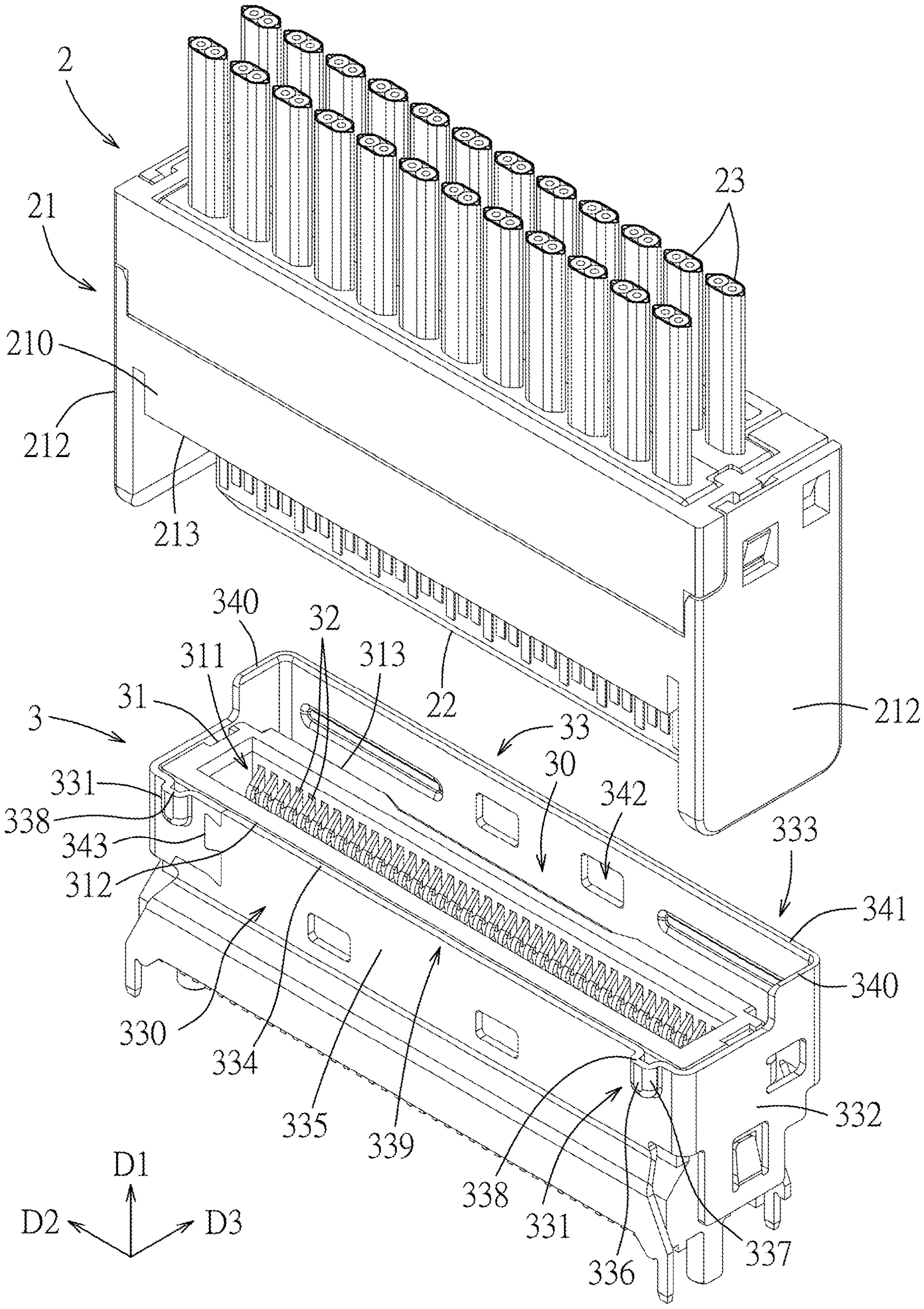
FIG. 4 is a perspective exploded view of the first embodiment viewed from another angle.
Figure 5:
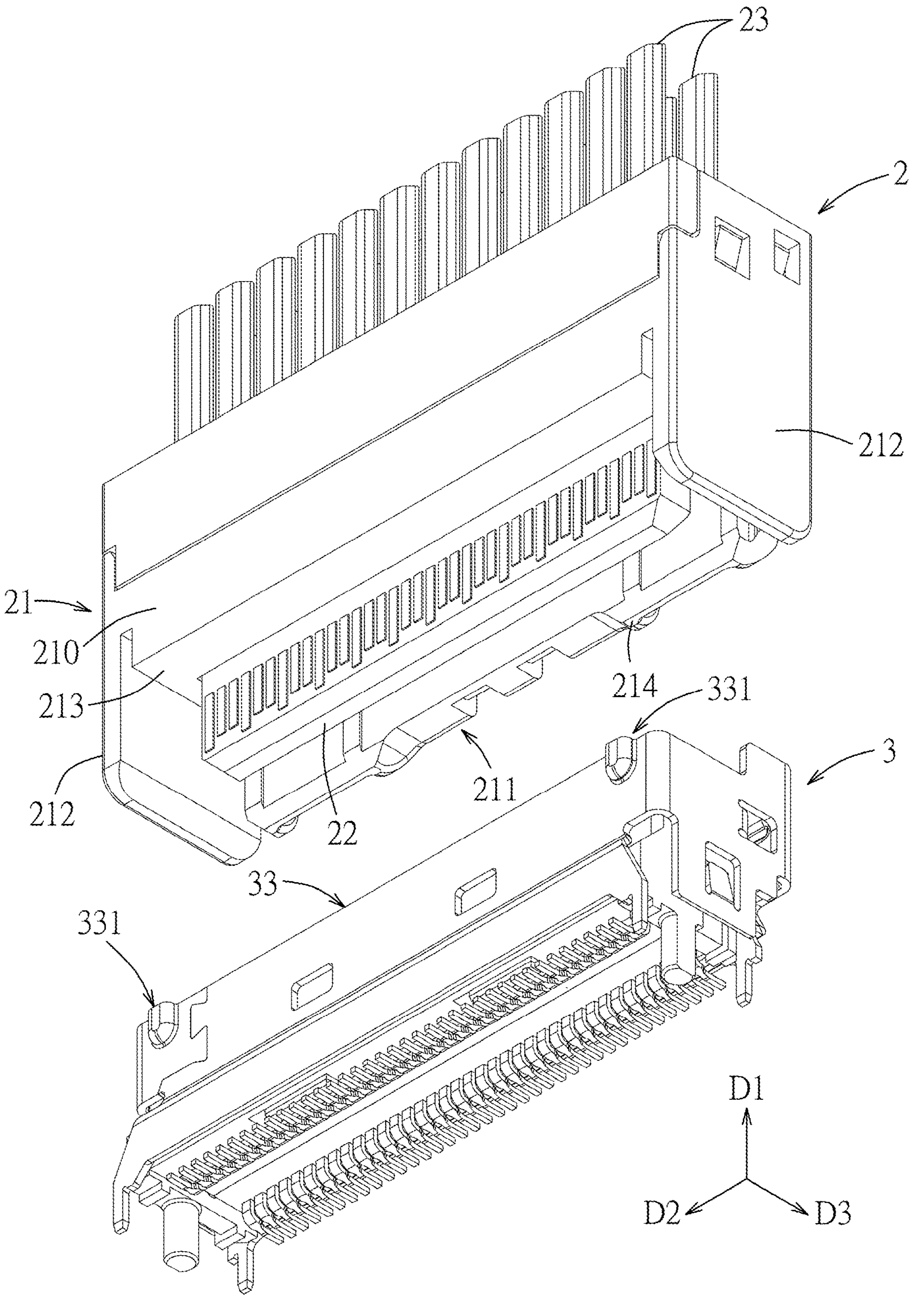
FIG. 5 is a perspective exploded view of the first embodiment viewed from another angle.

Referring to FIG. 3, FIG. 4 and FIG. 5, the cable-end connector 2 is a straight type cable-end connector, and includes a housing, which can be an insulative housing 21, a circuit board 22, a plurality of cables 23 and a latching member 24. The insulative housing 21 includes a housing body 210, a mating plate 211 and two side plates 212. The housing body 210 has a front end face 213. The mating plate 211 protrudes from the housing body 210 and protrudes relative to the front end face 213. The mating plate 211 has a front end portion 214 positioned in front of the front end face 213. The two side plates 212 protrude from the housing body 210 and protrude relative to the front end face 213. The two side plates 212 are spaced apart from each other along a length direction D2 and are respectively positioned at opposite sides of the mating plate 211. Each side plate 212 and the mating plate 211 are spaced apart from each other along the length direction D2 and a gap 215 is formed between each side plate 212 and the mating plate 211. The circuit board 22 is positioned at least partially within the housing body 210 and partially protrudes relative to the front end face 213. The circuit board 22 is parallel to the mating plate 211 and is spaced apart from the mating plate 211 along a width direction D3. The plurality of cables 23 are elastically connected to the circuit board 22. The latching member 24 is provided on an outer side of the mating plate 211, and the latching member 24 has two latching protrusions 241 which are spaced apart from each other along the length direction D2.

The board-end connector 3 includes a base, which may be an insulative base 31, a plurality of terminals 32 and a metal outer shell 33. The insulative base 31 is formed with a mating slot 311 which is used to allow the circuit board 22 to mate therewith. The insulative base 31 has two end faces 312, 313 which are spaced apart from each other along the width direction D3. The plurality of terminals 32 are positioned at least partially within the insulative base 31, a part of each terminal 32 is positioned in the mating slot 311 and is used to electrically connect the circuit board 22.

The metal outer shell 33 sheathes the insulative base 31 and includes an end plate 330, two protruding members 331, an outer frame 332 and a protruding frame 333. The end plate 330 abuts against the end face 312 of the insulative base 31 and has an end edge 334 and an outer plate face 335. The end edge 334 is used to abut against the front end face 213 of the housing body 210. Some embodiments of the protruding member 331 are structures which are formed on the end plate 330 by a processing manner, such as stamping, so that each protruding member 331 integrally protrudes outwardly from the end plate 330 and protrudes relative to the outer plate face 335. Each protruding member 331 is a hollow cage and has an end wall 336 and a connection wall 337. The end wall 336 is spaced apart from the outer plate face 335, the connection wall 337 is connected between an outer periphery of the end wall 336 and the end plate 330. The end wall 336 and the connection wall 337 together define a stopping portion 338 which is flush with the end edge 334. The stopping portion 338 is a U-shaped stopping end edge, and the stopping portion 338 is used to abut against the front end face 213 of the housing body 210 or stop the front end portion 214 of the mating plate 211. The two protruding members 331 are spaced apart from each other along the length direction D2, an interval space 339 is formed between the two protruding members 331.

The outer frame 332 is U-shaped and is connected to opposite sides of the end plate 330 and the outer frame 332 and the end plate 330 cooperate with each other to together surround an outer periphery of the insulative base 31, the outer frame 332 is spaced apart from the end face 313 of the insulative base 31, and a mating groove 30 is formed between the outer frame 332 and the end face 313 of the insulative base 31. The mating groove 30 is spaced apart from the mating slot 311 along the width direction D3 and is used to allow the mating plate 211 to mate therewith. The protruding frame 333 is U-shaped and protrudes from the outer frame 332. The protruding frame 333 has two side portions 340 which are spaced apart from each other along the length direction D2 and a connecting portion 341 which is connected between the two side portions 340. Each side portion 340 is used to insert into the corresponding gap 215. The connecting portion 341 and the outer frame 332 together define two latching holes 342 which are spaced apart along the length direction D2, and the two latching holes 342 are used to allow the two latching protrusions 241 of the latching member 24 to latch therewith.

It is noted that the metal outer shell 33 of the first embodiment is formed by processing (such as bending) a metal sheet, and two opposite ends of the metal sheet are engaged with each other to form a seam 343 on the end plate 330. Certainly, the seam 343 also may be formed on the outer frame 332, so the present disclosure is not limited such that the seam 343 is formed on the end plate 330.

Figure 6:
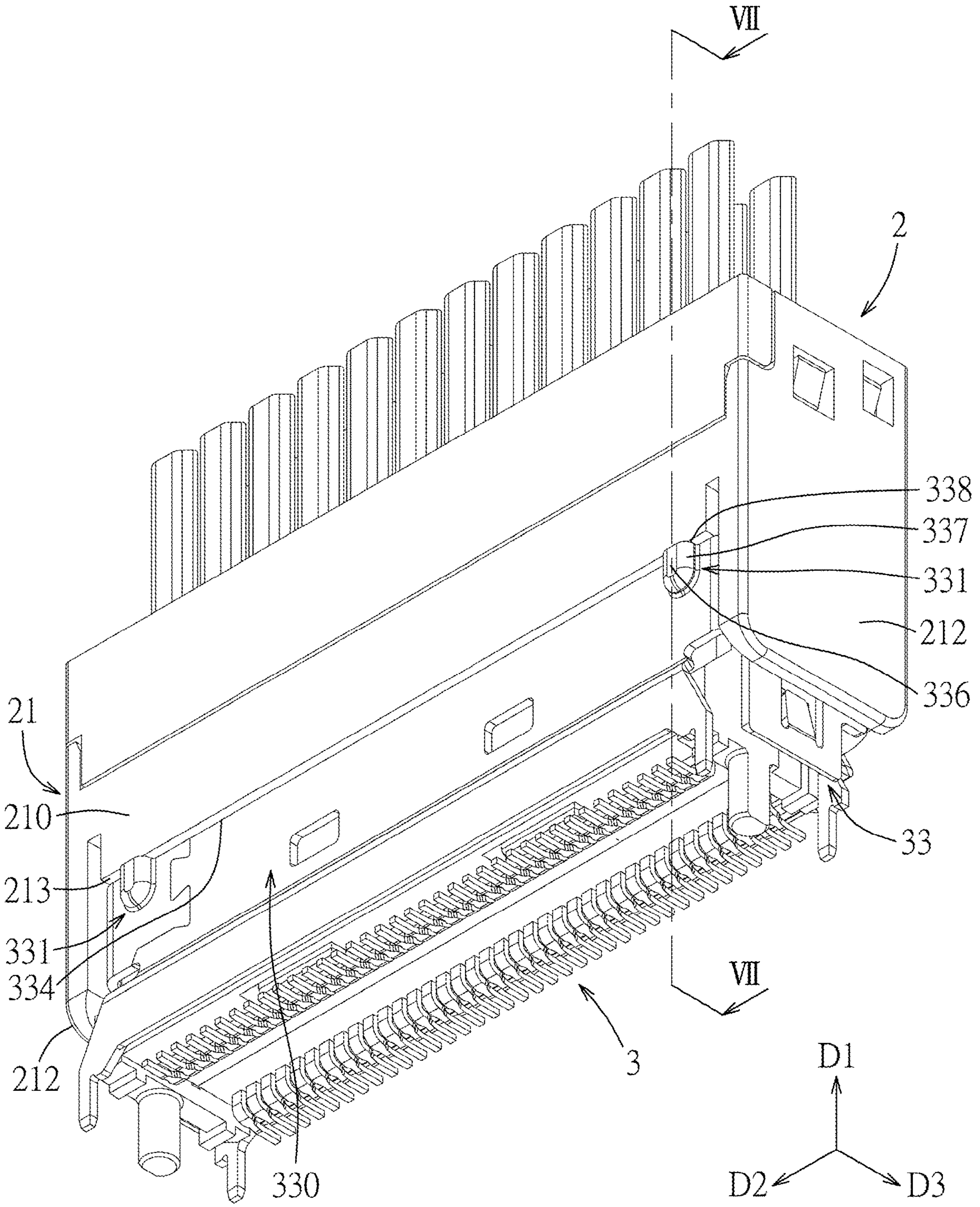
FIG. 6 is a perspective view of the first embodiment illustrating that the cable-end connector properly inserts into and mates with the board-end connector.
Figure 7:
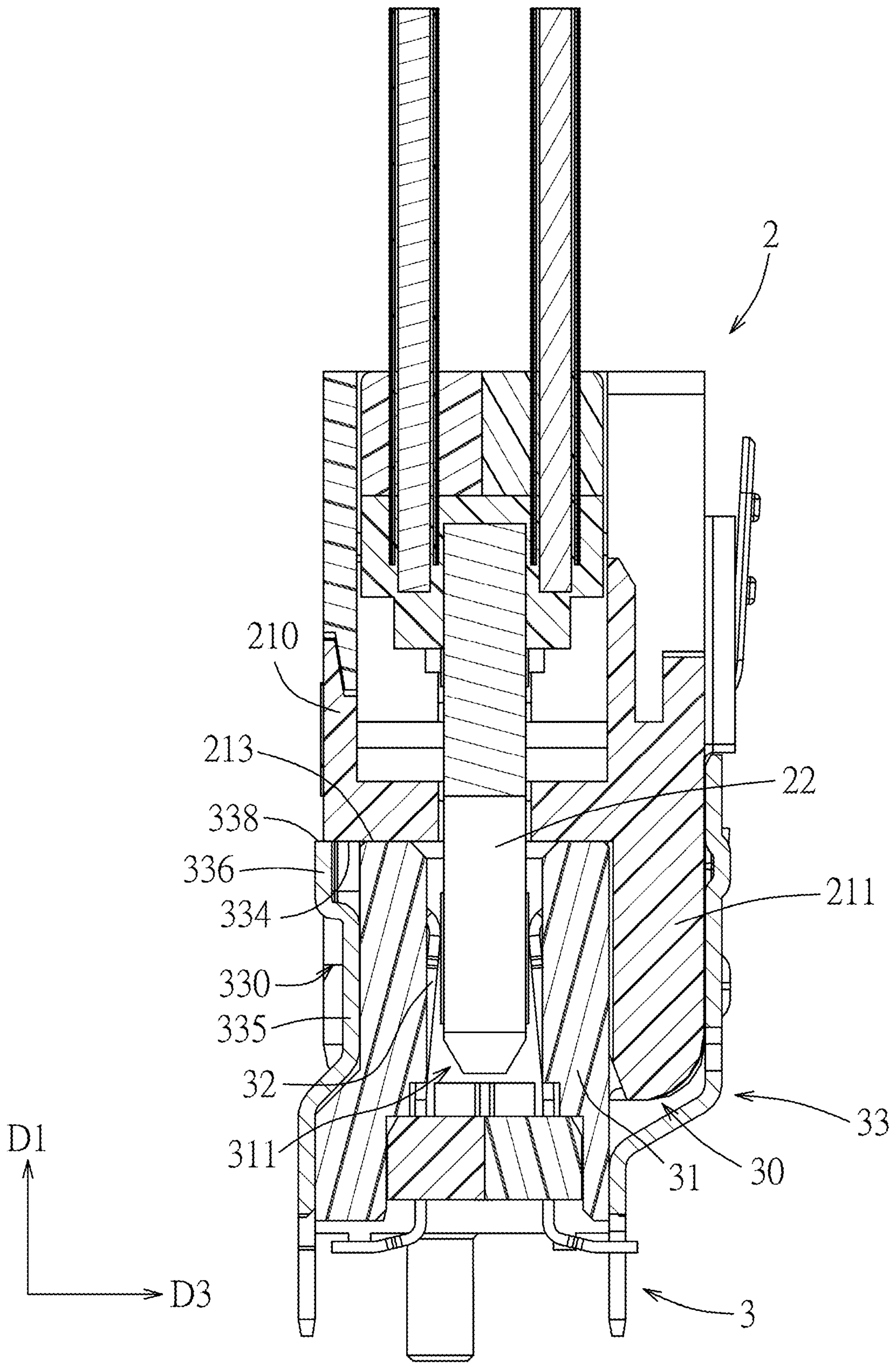
FIG. 7 is a cross sectional view taken along a VII-VII line of FIG. 6 illustrating that an end plate and two protruding members of the board-end connector abut against a front end face of the cable-end connector.

Referring to FIG. 3, FIG. 6 and FIG. 7, when the cable-end connector 2 moves along the height direction D1 and properly inserts into the board-end connector 3, the two side portions 340 of the protruding frame 333 will respectively enter into the two gaps 215, and the two side plates 212 respectively move to outer sides of the two side portions 340. With the cooperation between the two side portions 340 and the two gaps 215, the cable-end connector 2 can be guided to move along the height direction D1. Consequently, the mating plate 211 and the circuit board 22 will respectively enter into the mating groove 30 and the mating slot 311, and the circuit board 22 will contact the plurality of terminals 32 and will be electrically connected with the plurality of terminals 32. Next, the latching member 24 will be compressed by the connecting portion 341 of the protruding frame 333 to generate and accumulate an elastic restoring force.

When the front end face 213 of the cable-end connector 2 contacts the end edge 334 of the end plate 330 of the board-end connector 3 and the two stopping portions 338 of the two protruding members 331, the cable-end connector 2 is blocked and cannot continuously move. The latching member 24 rebounds by means of the accumulated restoring elastic force and makes the two latching protrusions 241 respectively latch to the two latching holes 342, thereby making the cable-end connector 2 mated with and positioned on the board-end connector 3. Because the end edge 334 of the end plate 330 and the two stopping portions 338 of the two protruding members 331 are flush with each other, the end edge 334 and the two stopping portions 338 can abut against the front end face 213 at the same time, which makes the end edge 334 and the two stopping portions 338 equivalently support the front end face 213 in a two dimensional plane space situated in the length direction D2 and the width direction D3, and thus can stably support the cable-end connector 2.

Figure 8:
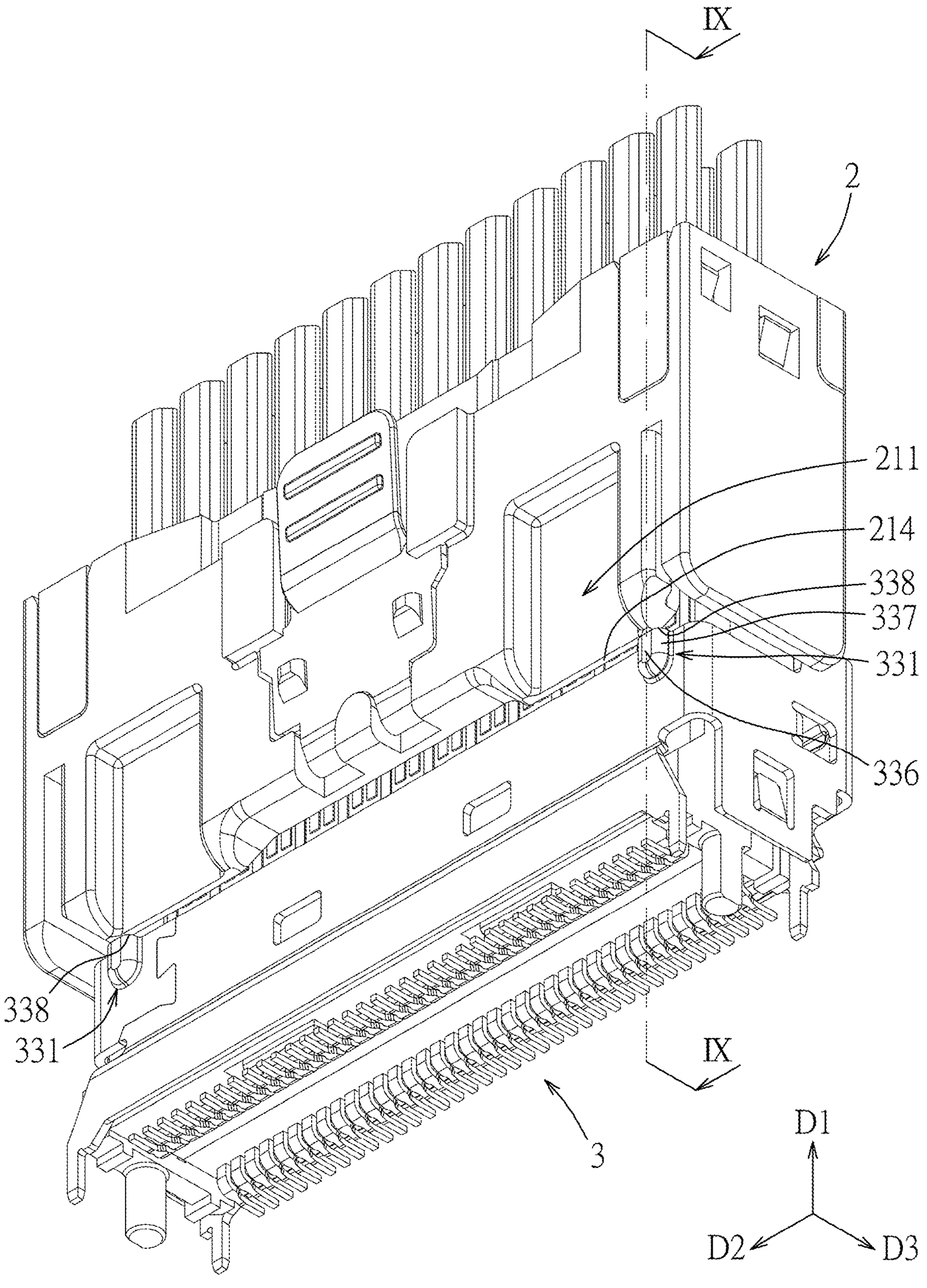
FIG. 8 is a perspective view of the first embodiment illustrating that the cable-end connector reversely inserts into the board-end connector.
Figure 9:
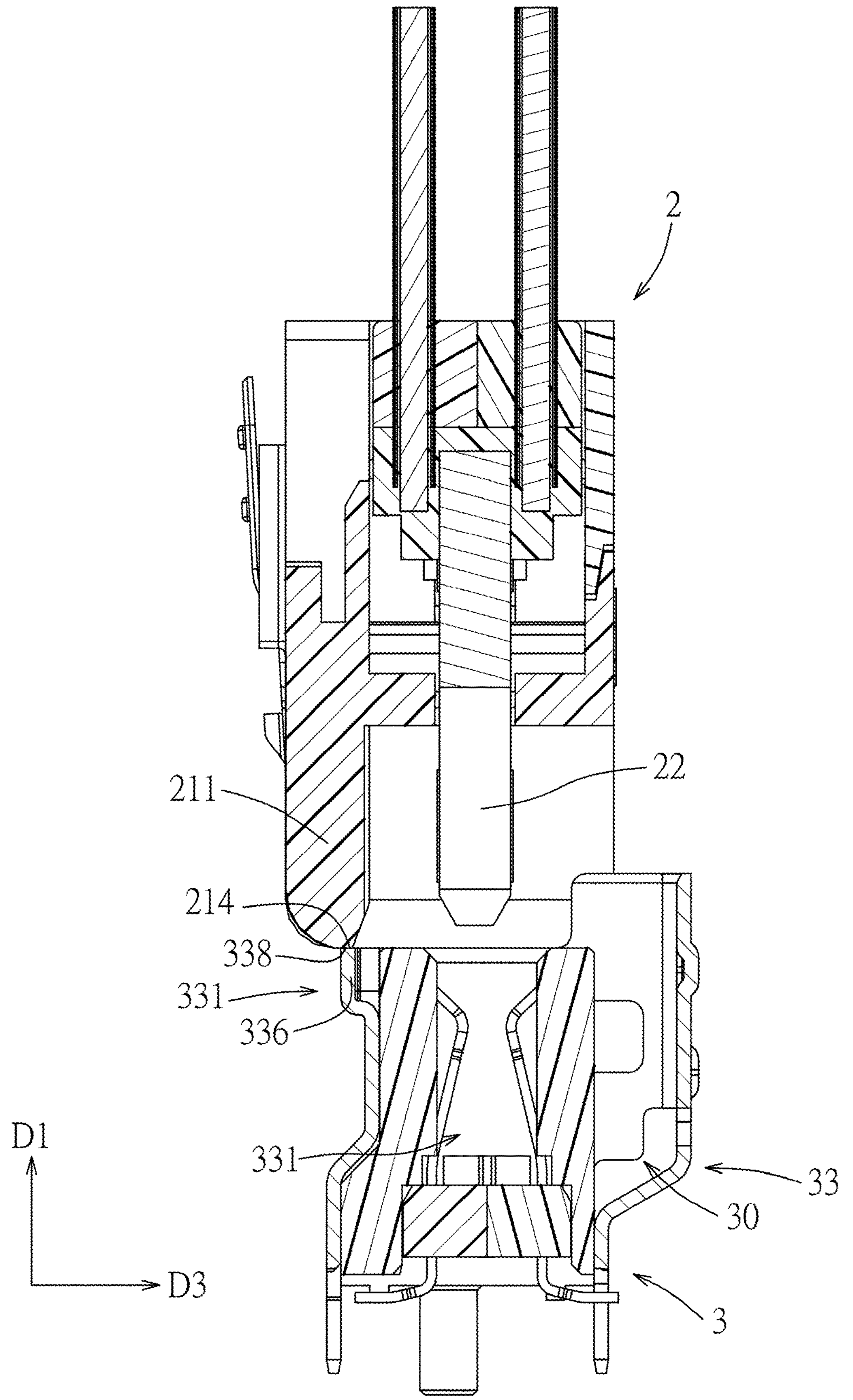
FIG. 9 is a cross sectional view taken along an IX-IX line of FIG. 8 illustrating that the two protruding members of the board-end connector stops a front end portion of the cable-end connector.

Referring to FIG. 8 and FIG. 9, when the cable-end connector 2 moves along the height direction D1 and reversely inserts into the board-end connector 3 after the cable-end connector 2 is rotated by 180 degrees, the two stopping portions 338 of the two protruding members 331 will contact and stop the front end portion 214 of the mating plate 211, such that the cable-end connector 2 cannot continuously move to mate with the board-end connector 3. Therefore, an effect of preventing a user from incorrectly inserting the cable-end connector 2 in a reverse orientation ("reversely") can be attained.

Referring to FIG. 4, FIG. 7 and FIG. 9, because the two protruding members 331 are structures formed from the end plate 330 by a processing manner, such as stamping, the two protruding members 331 are simple and convenient in manufacturing and formation. Moreover, the manner that the connection wall 337 is connected between the outer periphery of the end wall 336 and the end plate 330 in each protruding member 331 makes the whole structure strength of each protruding member 331 strong, so that each protruding member 331 is not easily affected by an external force to generate deformation. Therefore, the two protruding members 331 can stably support the front end face 213 or stop the front end portion 214. Moreover, because the board-end connector 3 is provided with the two protruding members 331 as the protective structure to prevent incorrect insertion, it is not necessary to change the structure of the cable-end connector 2. The effect of preventing incorrect insertion can be attained, and the manufacturing cost consumed to reform a mold to manufacture the cable-end connector 2 having a protective structure to prevent incorrect insertion can be saved.

It is noted that, in the first embodiment, the number of the protruding members 331 is two, so a contact area which the front end face 213 or the front end portion 214 contacts can be increased, the two protruding members 331 can more stably support the front end face 213 or stop the front end portion 214. Certainly, in the first embodiment, the number of the protruding members 331 also may be set as one or more as desired, and is not limited to be two.

Figure 10:
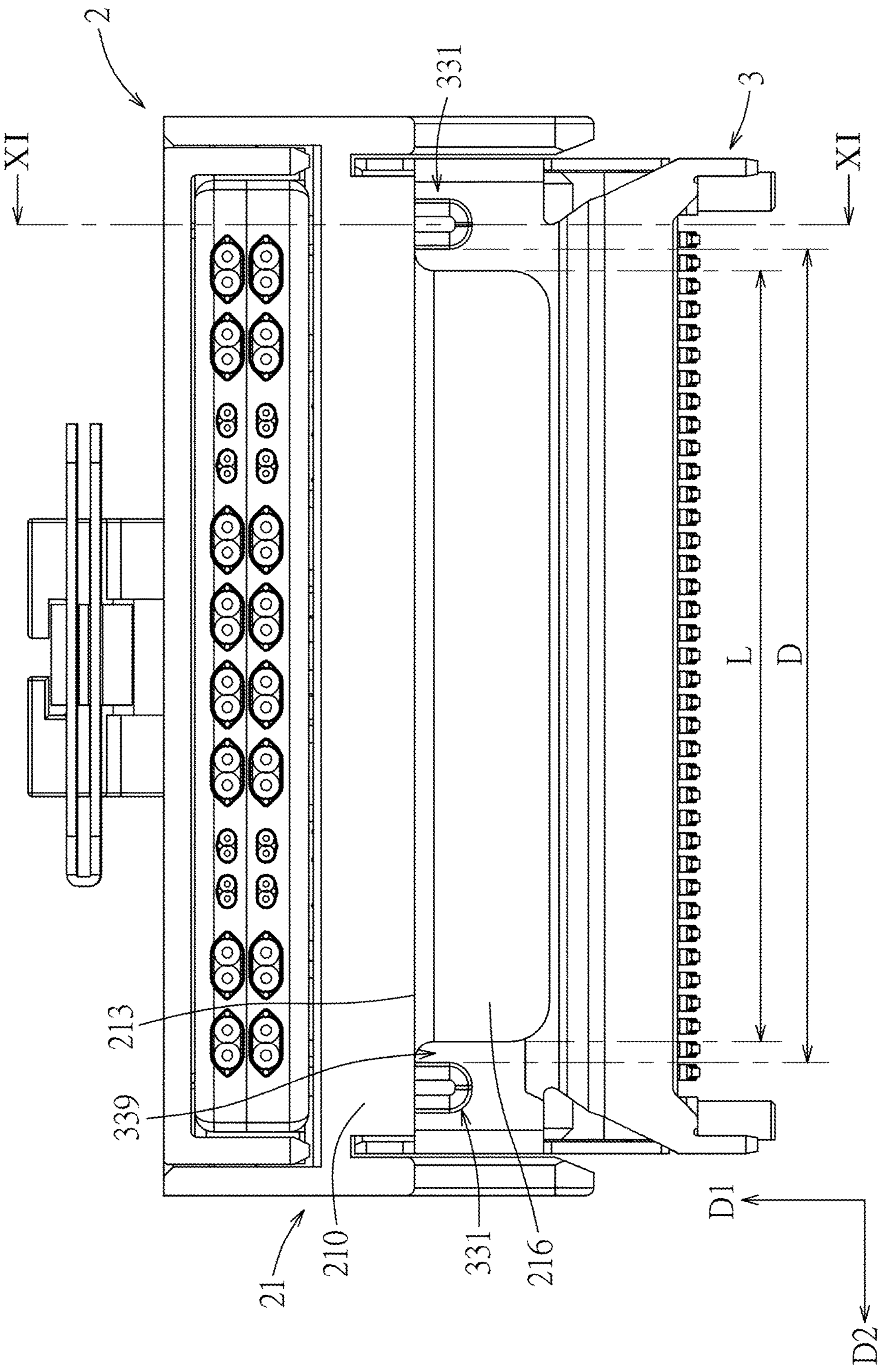
FIG. 10 is a front view of the first embodiment illustrating that the cable-end connector properly inserts into and mates with the board-end connector and a guiding plate of the cable-end connector enters into an interval space of the board-end connector.
Figure 11:
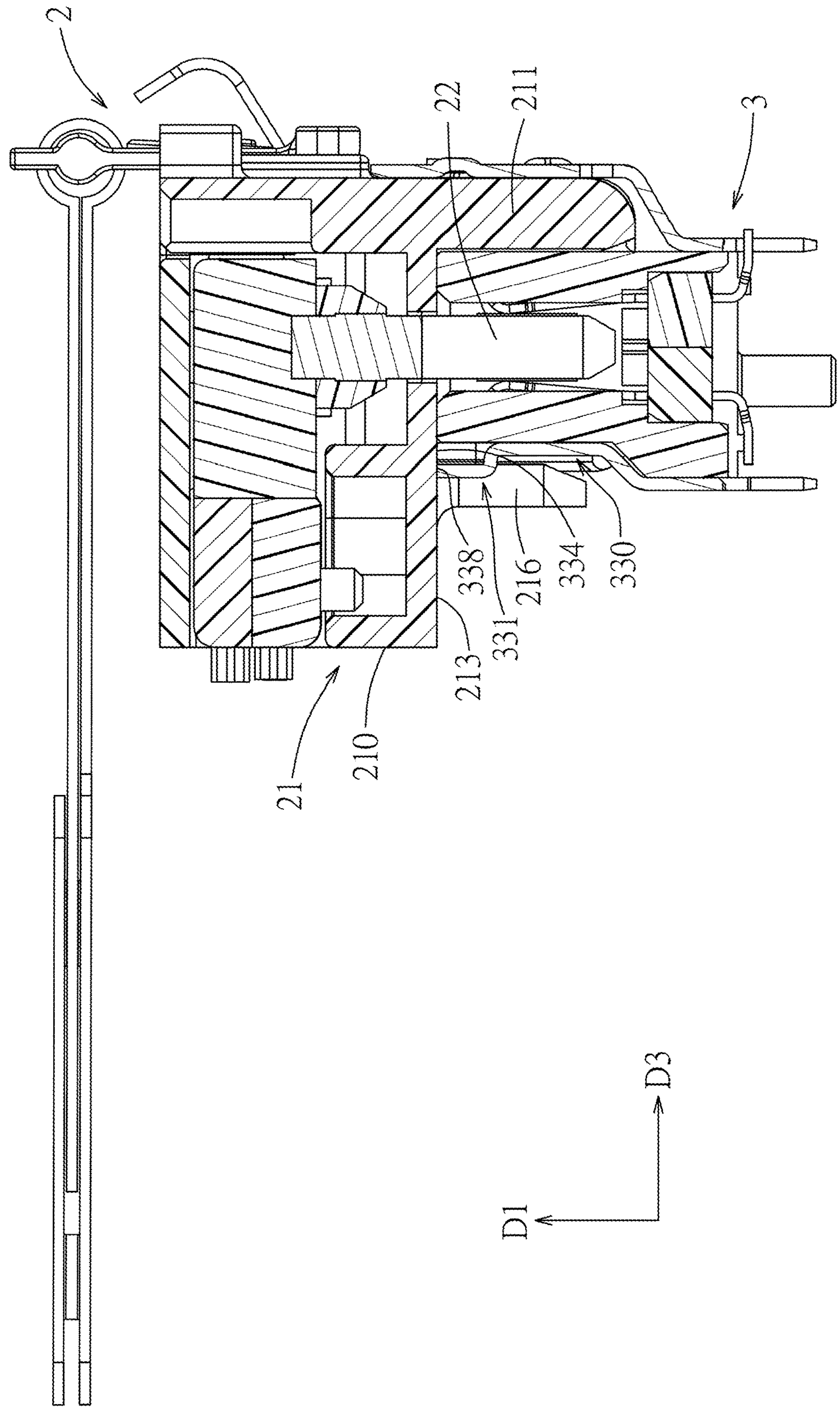
FIG. 11 is a cross sectional view taken along a XI-XI line of FIG. 10.

Referring to FIG. 10 and FIG. 11, in some embodiments, the cable-end connector 2 may be a right angle type cable-end connector, the insulative housing 21 of the cable-end connector 2 further includes a guiding plate 216. The guiding plate 216 protrudes from the housing body 210 and protrudes relative to the front end face 213. The guiding plate 216 is parallel to the circuit board 22 and is spaced apart from the circuit board 22 along the width direction D3, and the guiding plate 216 is positioned alongside of the circuit board 22 opposite to the mating plate 211. Because an interval D between the two protruding members 331 of the board-end connector 3 along the length direction D2 larger than a length L of the guiding plate 216 along the length direction D2, when the cable-end connector 2 properly inserts into the board-end connector 3, the guiding plate 216 will enter into the interval space 339 and will not be blocked by the two protruding members 331. Therefore, the board-end connector 3 can mate with the cable-end connector 2 in straight or right-angle mating configurations.

Figure 12:
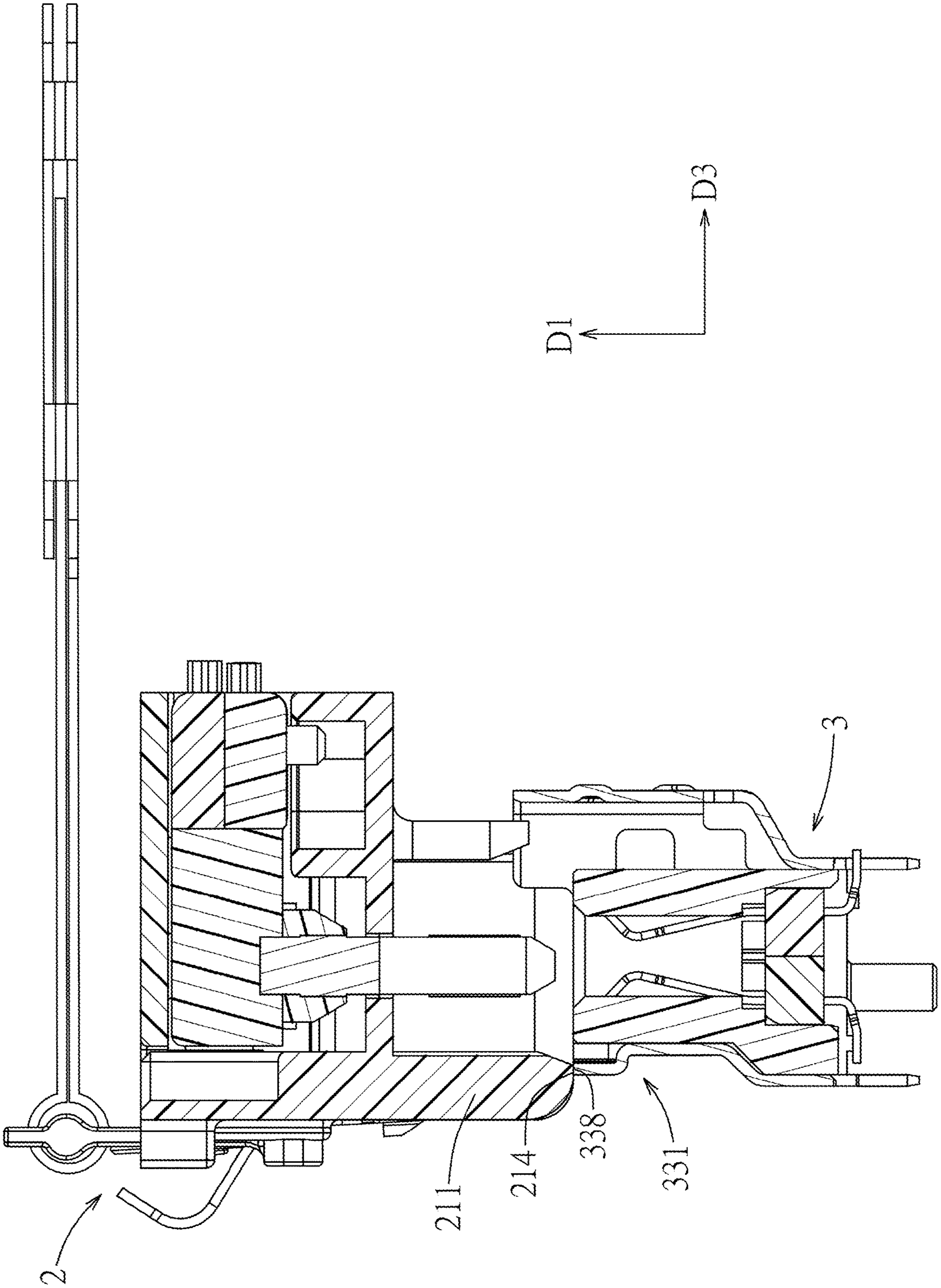
FIG. 12 is a cross sectional view of the first embodiment illustrating that the cable-end connector reversely inserts into the board-end connector.

Referring to FIG. 12, when the cable-end connector 2 moves along the height direction D1 and reversely inserts into the board-end connector 3 after the cable-end connector 2 in right angle type is rotated by 180 degrees, the two stopping portions 338 of the two protruding members 331 similarly will contact and stop the front end portion 214 of the mating plate 211, so as to prevent the cable-end connector 2 from mating with the board-end connector 3. Therefore, the board-end connector 3 can prevent the cable-end connector 2 in straight type and the cable-end connector 2 in right angle type from incorrect reverse insertion.

Figure 13:
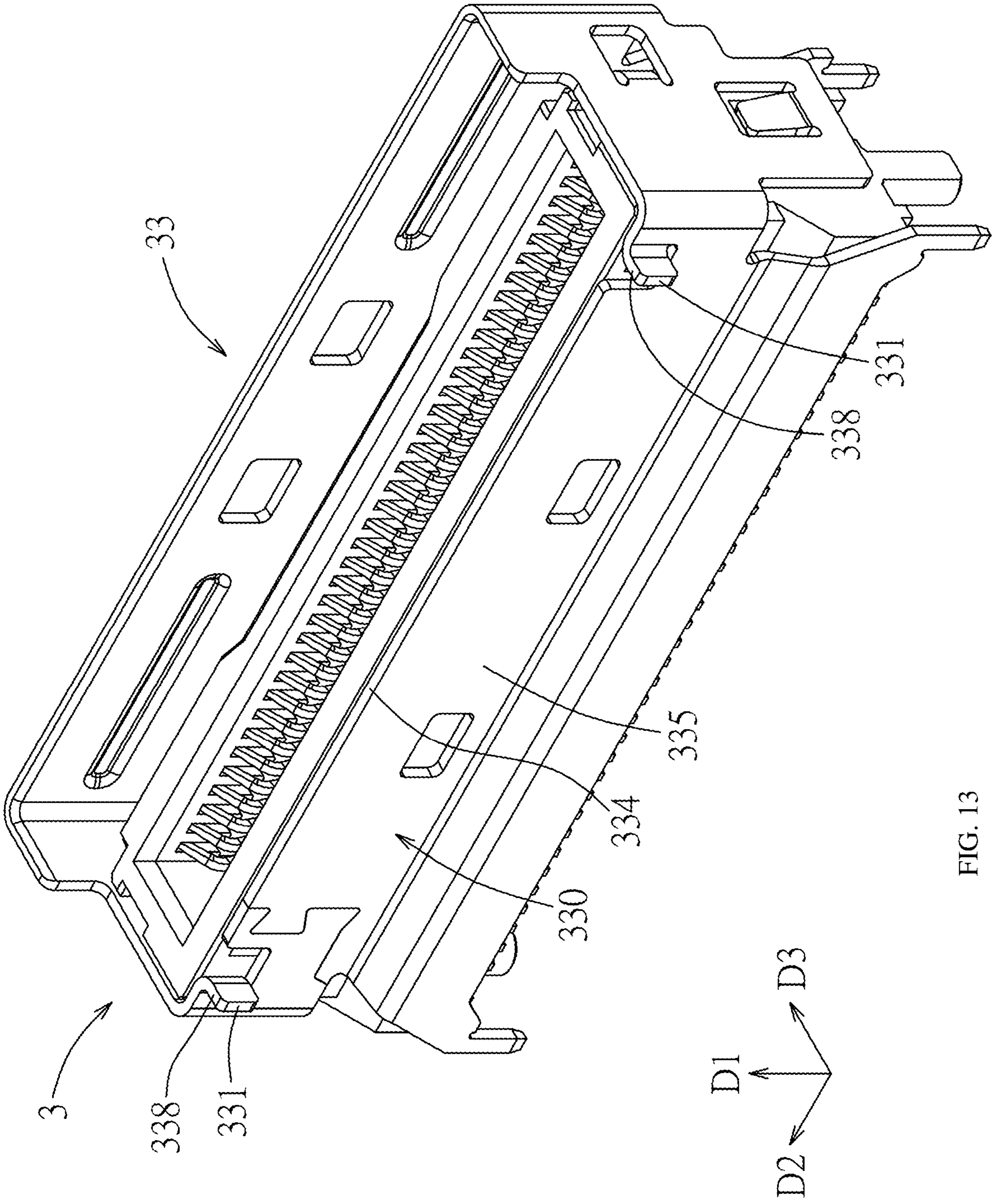
FIG. 13 is a perspective view of a board-end connector of a second embodiment of the electrical connection device of the present disclosure.

Referring to FIG. 13, the structure of a second embodiment of the electrical connection device of the present disclosure is substantially the same as that of the first embodiment, but difference therebetween lies in a structure of each protruding member 331 of the board-end connector 3.

Figure 14:
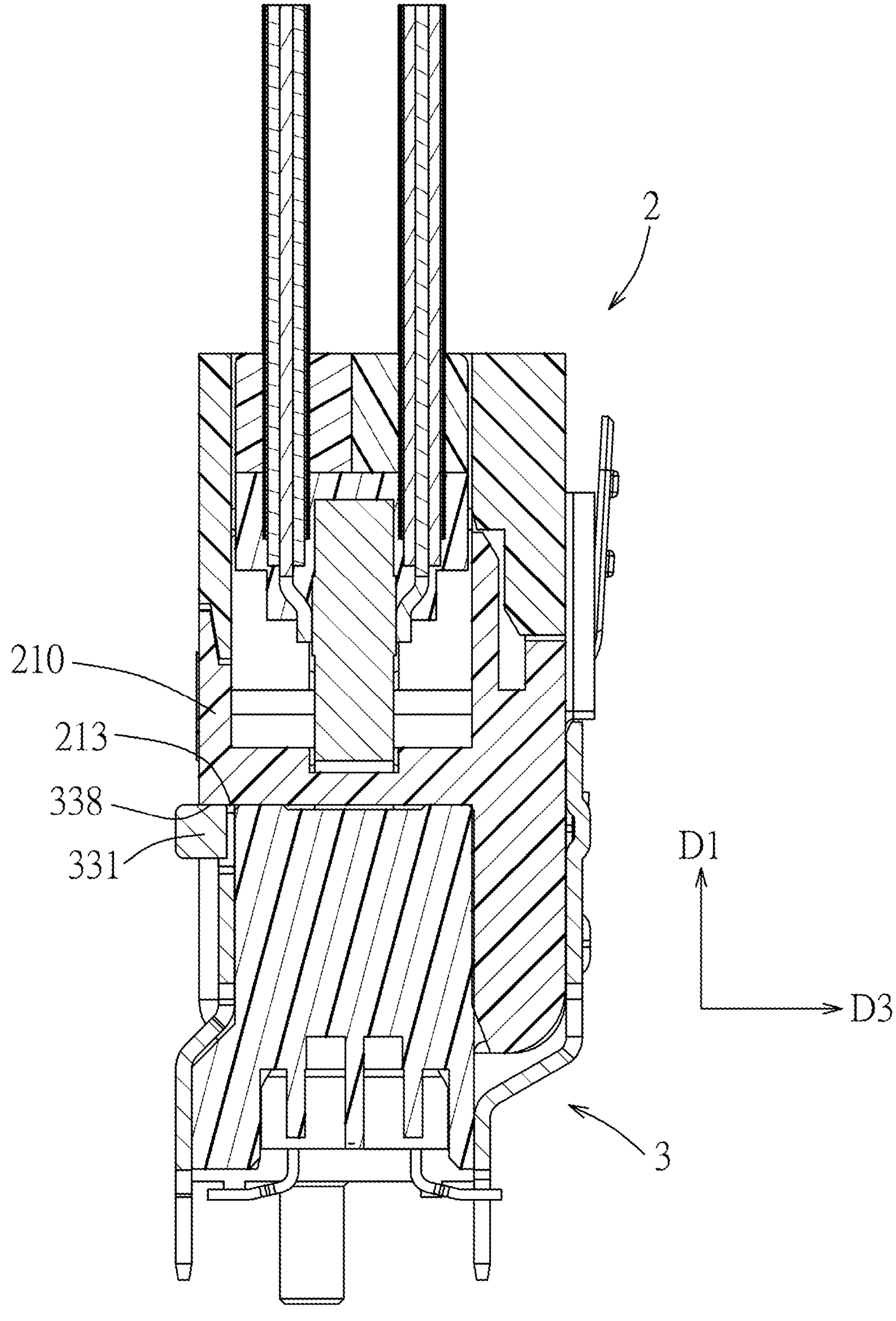
FIG. 14 is a cross sectional view of the second embodiment illustrating that the cable-end connector properly inserts into and mates with the board-end connector.
Figure 15:
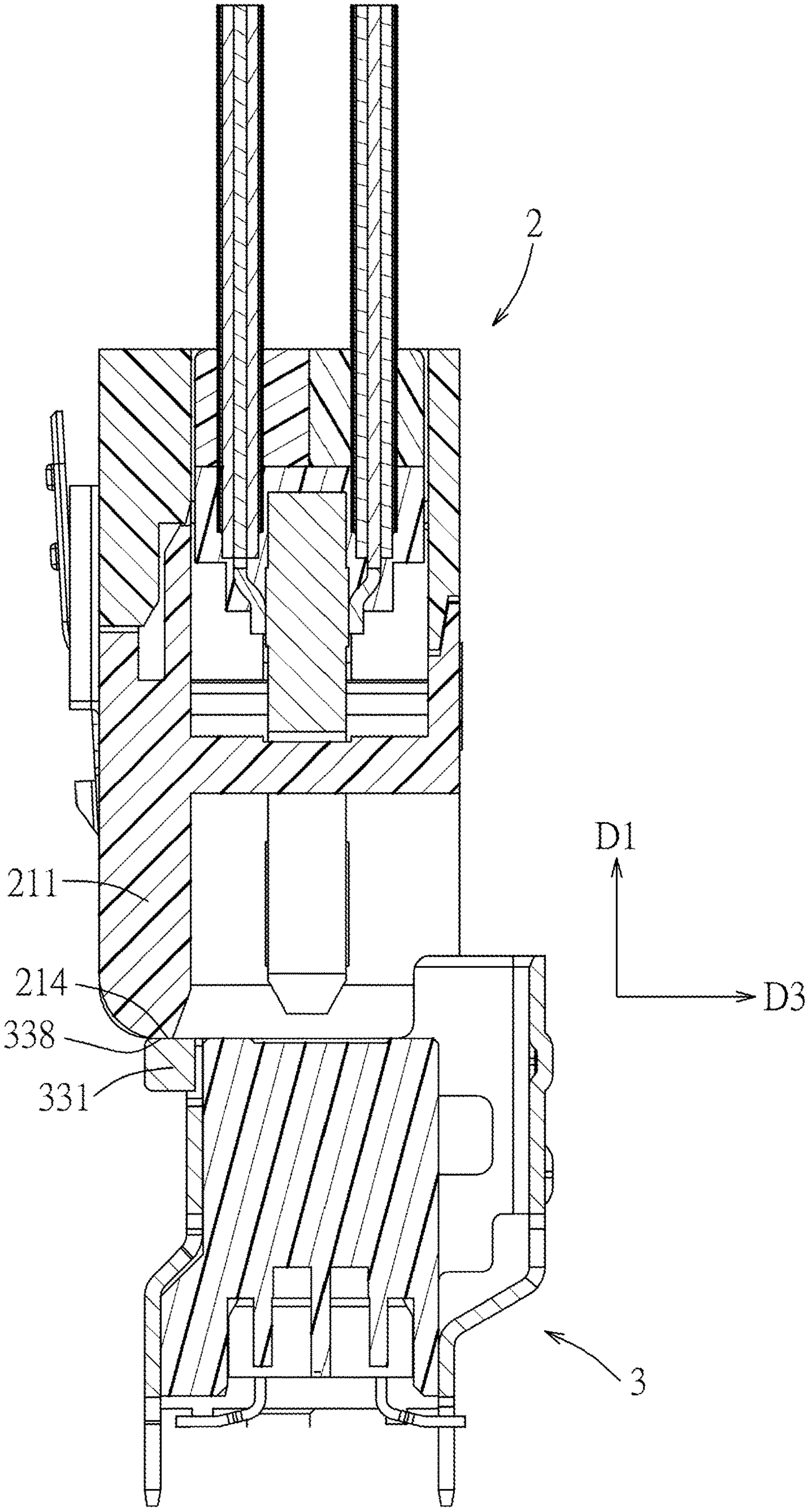
FIG. 15 is a cross sectional view of the second embodiment illustrating that the cable-end connector reversely inserts into the board-end connector.

In the second embodiment, each protruding member 331 is an upright plate which protrudes outwardly from the end plate 330 and is perpendicularly connected to the end plate 330. The stopping portion 338 of each protruding member 331 is a stopping end edge which is elongated. When the cable-end connector 2 properly inserts into the board-end connector 3 as shown in FIG. 14, the two stopping portions 338 of the two protruding members 331 support the front end face 213 of the cable-end connector 2. When the cable-end connector 2 reversely inserts into the board-end connector 3 as shown in FIG. 15, the two stopping portions 338 of the two protruding members 331 stop the front end portion 214 of the cable-end connector 2.

Figure 16:
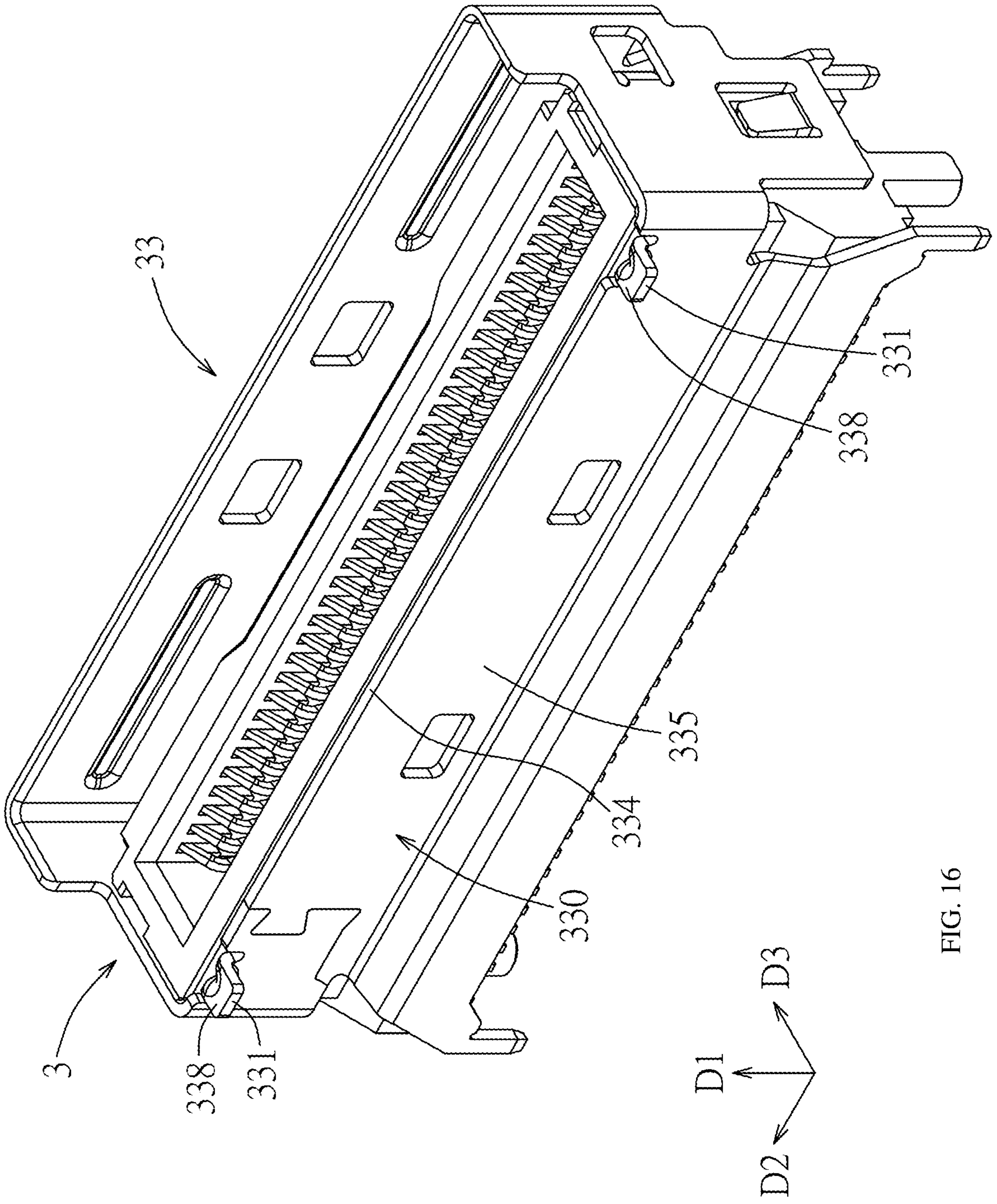
FIG. 16 is a perspective view of a board-end connector of a third embodiment of the electrical connection device of the present disclosure.

Referring to FIG. 16, a whole structure of a third embodiment of the electrical connection device of the present disclosure is substantially the same as that of the first embodiment, but difference therebetween lies in a structure of each protruding member 331 of the board-end connector 3.

Figure 17:
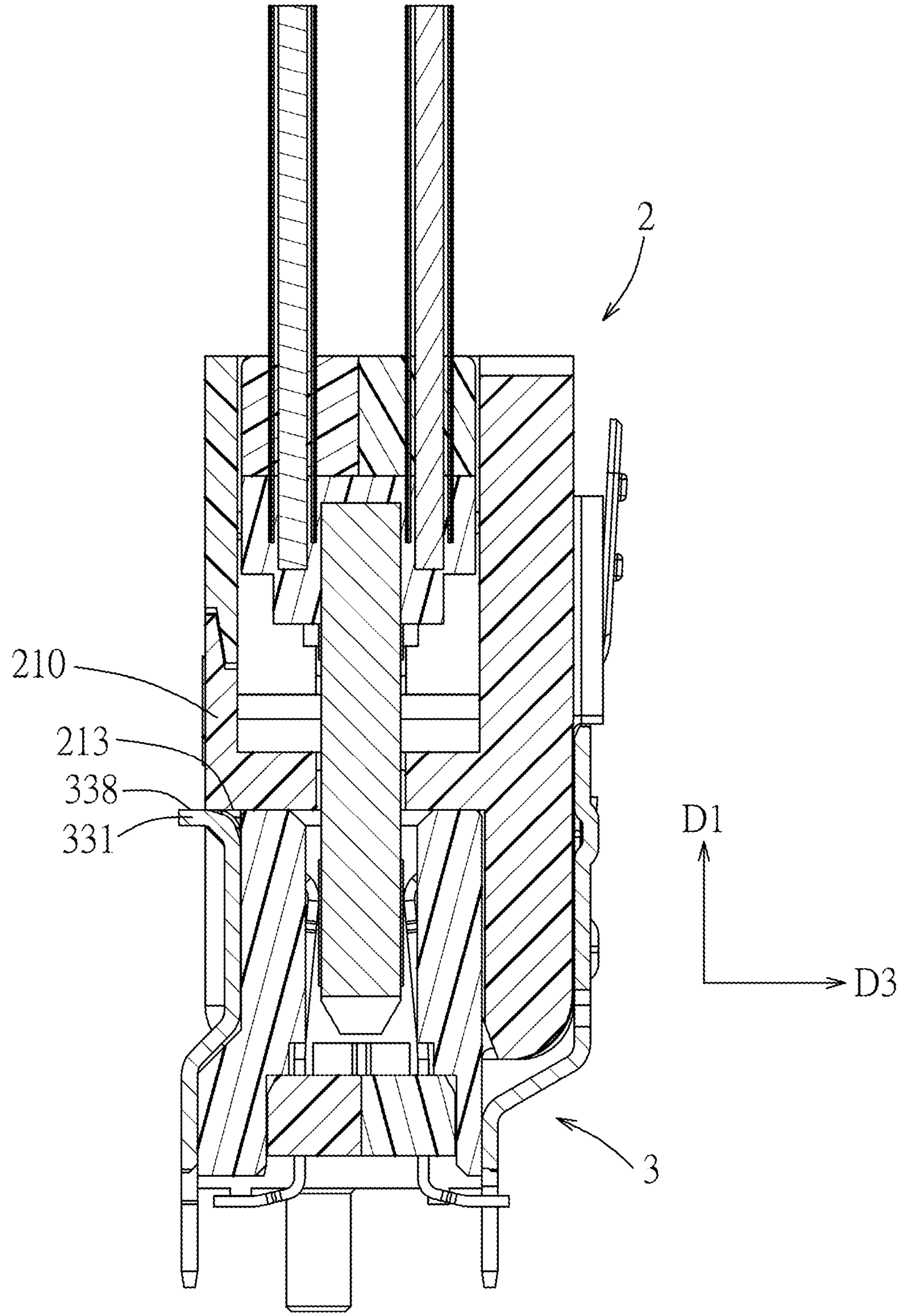
FIG. 17 is a cross sectional view of the third embodiment illustrating that the cable-end connector properly inserts into and mates with the board-end connector.
Figure 18:
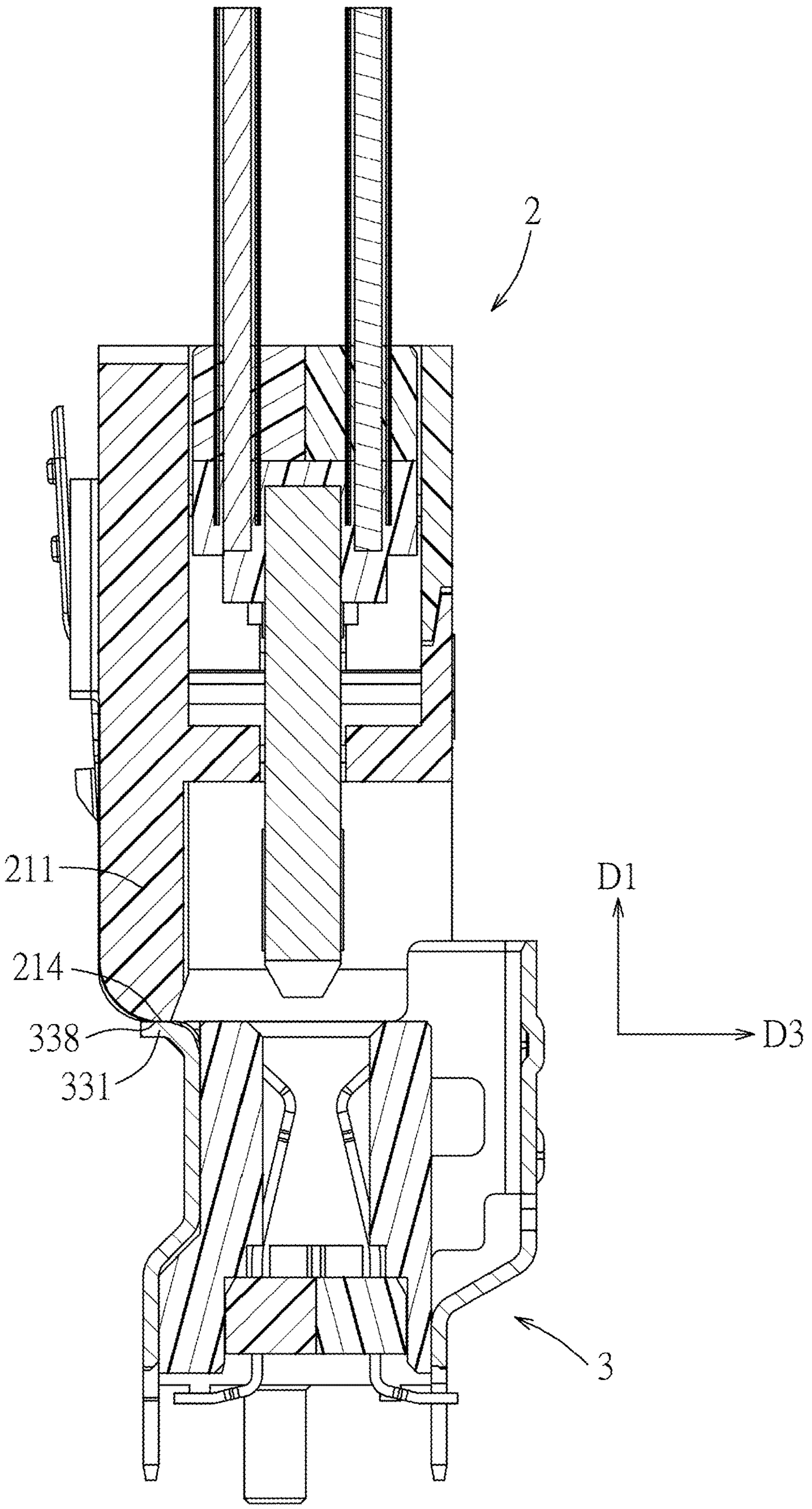
FIG. 18 is a cross sectional view of the third embodiment illustrating that the cable-end connector reversely inserts into the board-end connector.

In the third embodiment, each protruding member 331 is a flat plate which protrudes outwardly from the end plate 330 and is perpendicularly connected to the end plate 330, the stopping portion 338 of each protruding member 331 is a stopping face which is plane-shaped. When the cable-end connector 2 properly inserts into the board-end connector 3 as shown in FIG. 17, the two stopping portions 338 of the two protruding members 331 support the front end face 213 of the cable-end connector 2. When the cable-end connector 2 reversely inserts into the board-end connector 3 as shown in FIG. 18, the two stopping portions 338 of the two protruding members 331 stop the front end portion 214 of the cable-end connector 2.

Figure 19:
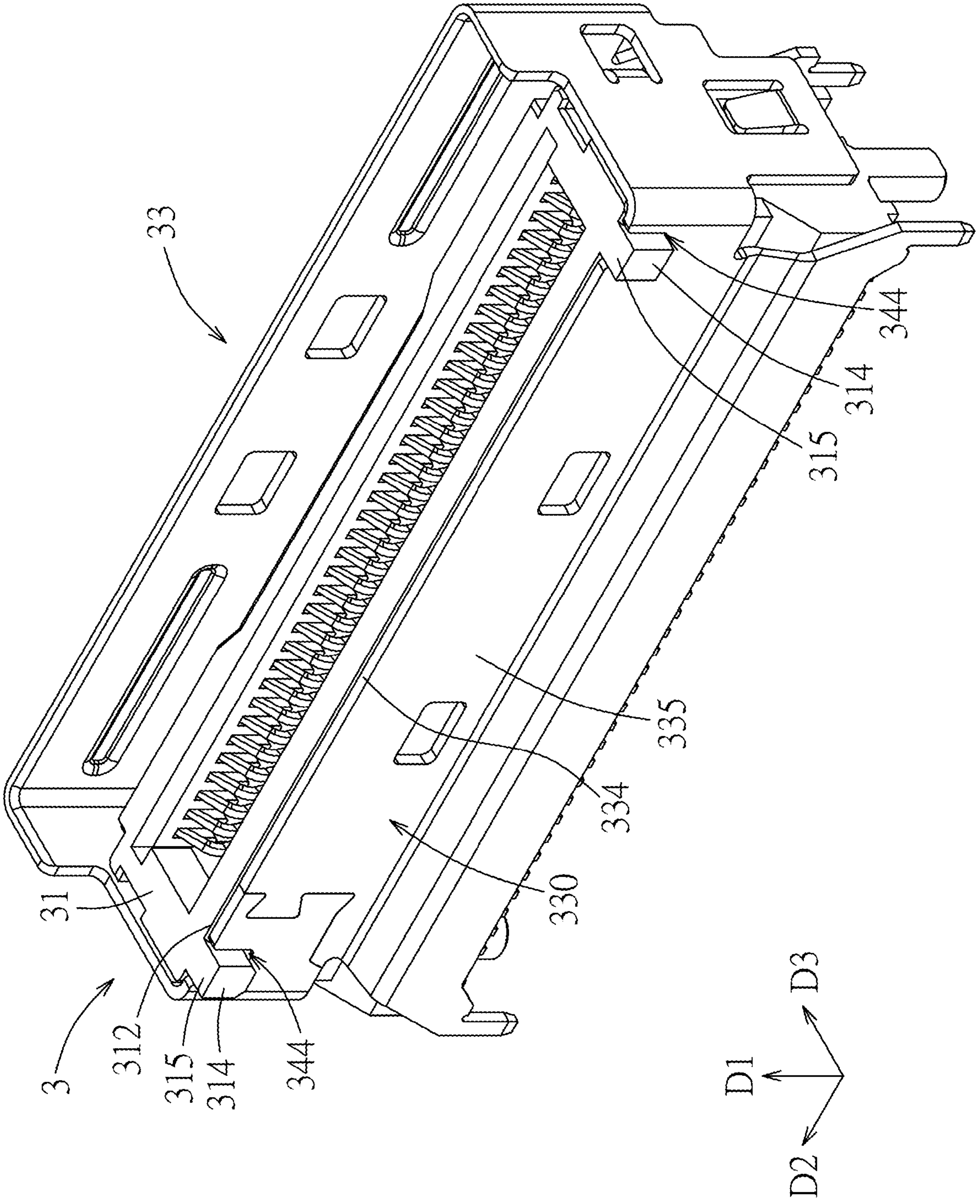
FIG. 19 is a perspective view of a board-end connector of a fourth embodiment of the electrical connection device of the present disclosure.

Referring to FIG. 19, a whole structure of a fourth embodiment of the electrical connection device of the present disclosure is substantially the same as that of the first embodiment, but difference therebetween lies in providing positions of the protruding members.

In the fourth embodiment, the end plate 330 of the board-end connector 3 is formed with two openings 344 which are spaced apart from each other along the length direction D2. The insulative base 31 has two protruding members 314, the two protruding member 314 integrally protrude from the end face 312 and are spaced apart from each other along the length direction D2, the two protruding members 314 respectively pass through the two openings 344 and protrude outwardly relative to the outer plate face 335 of the end plate 330. Each protruding member 314 is a protruding block which is perpendicularly connected to the end face 312, each protruding member 314 has a stopping portion 315 which is flush with the end edge 334 of the end plate 330, and the stopping portion 315 is a stopping face which is plane-shaped.

Figure 20:
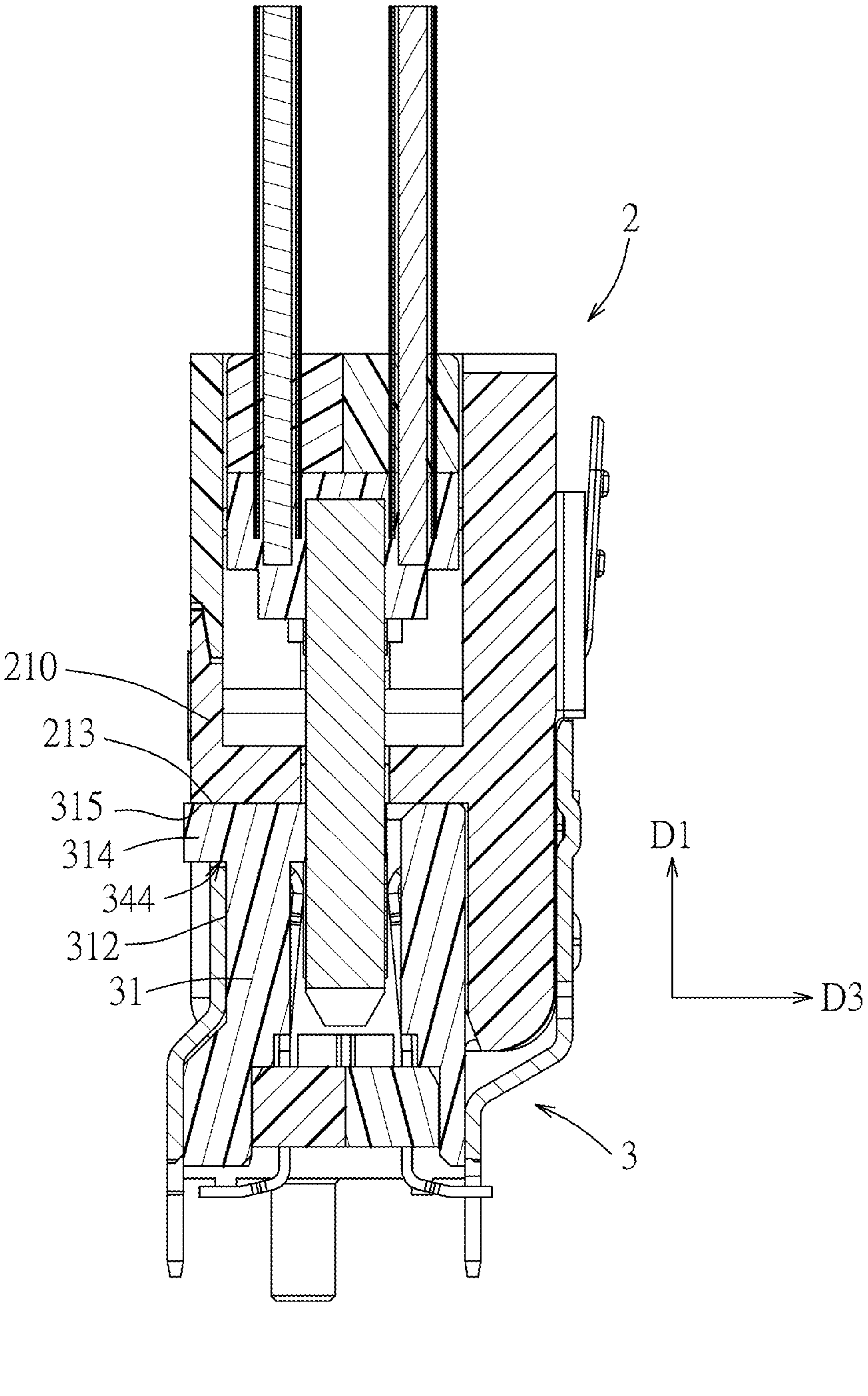
FIG. 20 is a cross sectional view of the fourth embodiment illustrating that the cable-end connector properly inserts into and mates with the board-end connector.
Figure 21:
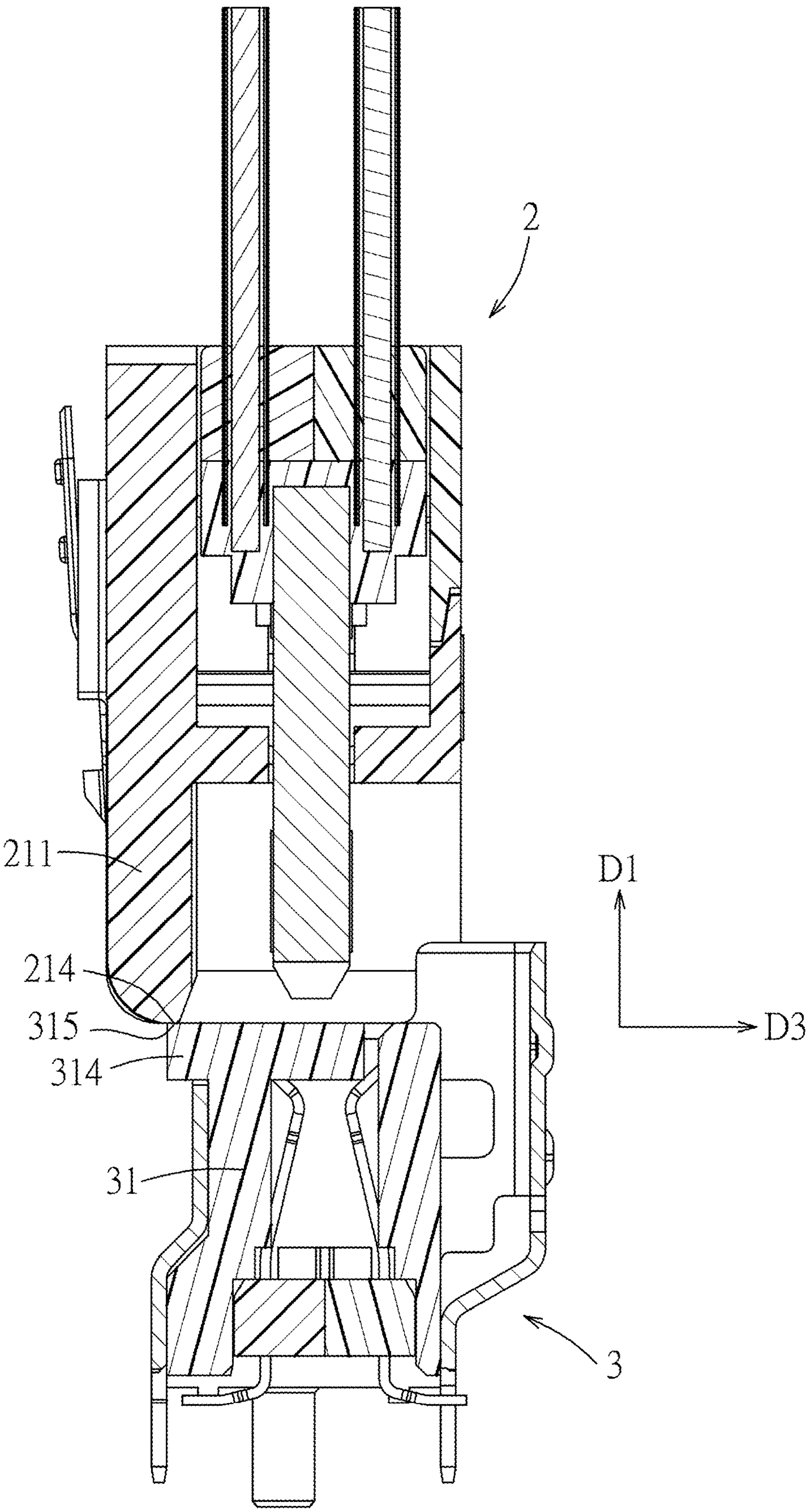
FIG. 21 is a cross sectional view of the fourth embodiment illustrating that the cable-end connector reversely inserts into the board-end connector.

When the cable-end connector 2 properly inserts into the board-end connector 3 as shown in FIG. 20, the two stopping portions 315 of the two protruding members 314 support the front end face 213 of the cable-end connector 2. When the cable-end connector 2 reversely inserts into the board-end connector 3 as shown in FIG. 21, the two stopping portion 315 of the two protruding member 314 stop the front end portion 214 of the cable-end connector 2.

In conclusion, in each embodiment of the electrical connection device, the stopping portions 338, 315 of the protruding members 331, 314 of the board-end connector 3 are flush with the end edge 334 of the end plate 330 and the protruding members 331, 314 and the end edge 334 can together support the front end face 213 in the two dimensional plane space, having an effect of stably supporting the cable-end connector 2 when the cable-end connector 2 properly inserts into the board-end connector 3 can be played. Moreover, the stopping portions 338, 315 of the protruding members 331, 314 can stop the front end portion 214 of the cable-end connector 2, preventing a user from inserting the cable-end connector 2 incorrectly into the board-end connector 3 in a reverse orientation. Moreover, the board-end connector 3 is provided with the protruding members 331, 314 as protective structure to prevent incorrect insertion, and manufacturing cost consumed to reform a mold to manufacture the cable-end connector 2 having a protective structure to prevent incorrect insertion can be saved, so an object of the present disclosure indeed can be attained.

However, the above description is only for embodiments of the present disclosure and it is not intended to limit the implementing scope of the present disclosure, and the simple equivalent changes and modifications made according to the claims and the contents of the specification are still included in the scope of the present disclosure.

The invention claimed is:

1. An electrical connection device comprising:

a cable-end connector comprising:

a housing comprising a housing body and a mating plate, the housing body having a front end face, the mating plate protruding from the housing body and having a front end portion positioned in front of the front end face; and a circuit board supported by the housing body, partially protruding relative to the front end face and spaced apart from the mating plate;

a board-end connector comprising:

a base formed with a mating slot which is used to allow the circuit board to mate therewith;

a plurality of terminals supported by the base and used to electrically connect the circuit board; and a metal outer shell sheathing the base, a mating groove being formed between the metal outer shell and the base and being used to allow the mating plate to mate therewith, wherein one of the base and the metal outer shell is provided with at least one protruding member protruding outwardly therefrom;

when the cable-end connector properly inserts into the board-end connector, the cable-end connector mates with the board-end connector, the protruding member abuts against the front end face of the housing body, and the mating plate mates into the mating groove between the metal outer shell and the base of the board-end connector; and when the cable-end connector reversely inserts into the board-end connector, the protruding member stops the front end portion of the mating plate so as to prevent the cable-end connector from mating with the board-end connector.

2. The electrical connection device of claim 1, wherein the metal outer shell has an end plate and the protruding member is a hollow cage which protrudes outwardly from the end plate, the protruding member having a stopping portion which is U-shaped and is positioned to abut against the front end face or stop the front end portion.

3. The electrical connection device of claim 2, wherein the metal outer shell comprises an end edge which is positioned to abut against the front end face and the stopping portion is flush with the end edge.

4. The electrical connection device of claim 1, wherein the metal outer shell has an end plate, the protruding member is an upright plate which protrudes outwardly from the end plate, and the protruding member has a stopping portion which is elongated and is positioned to abut against the front end face or stop the front end portion.

5. The electrical connection device of claim 1, wherein the metal outer shell has an end plate, the protruding member is a flat plate which protrudes outwardly from the end plate, and the protruding member has a stopping portion which is plane-shaped and is positioned to abut against the front end face or stop the front end portion.

6. The electrical connection device of claim 1, wherein the base has an end face, the protruding member is a protruding block which protrudes outwardly from the end face and protrudes outwardly relative to the metal outer shell, and the protruding member has a stopping portion which is plane-shaped and is positioned to abut against the front end face or stop the front end portion.

7. The electrical connection device of claim 1, wherein the metal outer shell comprises an end plate, the end plate has an end edge which is used to abut against the front end face, the protruding member protrudes outwardly from the end plate and has a stopping portion which is flush with the end edge, the stopping portion is used to abut against the front end face or stop the front end portion.

8. The electrical connection device of claim 1, wherein one of the base and the metal outer shell is a provided with two protruding members which are spaced apart from each other and an interval space is formed between the two protruding members.

9. The electrical connection device of claim 8, wherein the housing further comprises a guiding plate which protrudes from the housing body, the guiding plate is spaced apart from the circuit board and positioned alongside the circuit board opposite to the mating plate, an interval between the two protruding members is larger than a length of the guiding plate, and when the cable-end connector properly inserts into the board-end connector, the guiding plate enters into the interval space.

10. The electrical connection device of claim 1, wherein the housing further comprises two side plates which protrude from the housing body, the mating plate is positioned between the two side plates, each side plate and the mating plate are spaced apart from each other, two gaps are formed, with one gap between each side plate and the mating plate, and when the mating plate mates with the mating groove, the two side plates are positioned outside the metal outer shell.

11. The electrical connection device of claim 10, wherein the metal outer shell comprises a protruding frame, the protruding frame is U-shaped and has two side portions which are spaced apart from each other and a connecting portion which is connected between the two side portions, and when the cable-end connector properly inserts into the board-end connector, the two side portions respectively enter into the two gaps.

12. The electrical connection device of claim 1, wherein the cable-end connector further comprises a latching member which is provided to the mating plate and is used to latch with the metal outer shell.

13. The electrical connection device of claim 1, wherein the cable-end connector further comprises a plurality of cables which electrically connect to the circuit board.

14. An electrical connection device comprising:

a cable-end connector comprising:

a housing comprising a housing body and a mating plate, the housing body having a front end face, the mating plate protruding from the housing body and having a front end portion positioned in front of the front end face; and a circuit board supported by the housing body, partially protruding relative to the front end face and spaced apart from the mating plate;

a board-end connector comprising:

a base formed with a mating slot;

a plurality of terminals supported by the base; and a metal outer shell comprising at least one protruding member on one side, a protruding frame on another side, and a mating groove formed between the protruding frame and the base, wherein when the cable-end connector properly inserts into the board-end connector, the protruding member of the metal outer shell abuts against the front end face of the housing body and the mating plate of the housing mates between the protruding frame and the base of the board-end connector; and when the cable-end connector reversely inserts towards the board-end connector, the protruding member stops the front end portion of the mating plate so as to prevent the cable-end connector from mating with the board-end connector.

15. The electrical connection device of claim 14, wherein the protruding member comprises a U-shaped stopping portion.

16. The electrical connection device of claim 14, wherein the metal outer shell further comprises an end plate and the protruding member is an upright plate which protrudes outwardly from the end plate.

17. The electrical connection device of claim 14, wherein the base comprises an end face, the protruding member is a protruding block which protrudes outwardly from the end face and protrudes outwardly relative to the metal outer shell, and the protruding member has a stopping portion which is plane-shaped.

18. The electrical connection device of claim 14, wherein the metal outer shell is a provided with two protruding members which are spaced apart from each other and an interval space is formed between the two protruding members, the housing further comprises a guiding plate which protrudes from the housing body, the guiding plate is spaced apart from the circuit board and positioned alongside the circuit board opposite to the mating plate, the interval between the two protruding members is larger than a length of the guiding plate, and when the cable-end connector properly inserts into the board-end connector, the guiding plate enters into the interval space.

19. The electrical connection device of claim 14, wherein the housing further comprises two side plates which protrude from the housing body, the mating plate is positioned between the two side plates, each side plate and the mating plate are spaced apart from each other, two gaps are formed, with one gap between each side plate and the mating plate, and when the mating plate mates with the mating groove, the two side plates are positioned outside the metal outer shell.

20. The electrical connection device of claim 19, wherein the metal outer shell comprises a protruding frame, the protruding frame is U-shaped and has two side portions which are spaced apart from each other and a connecting portion which is connected between the two side portions, and when the cable-end connector properly inserts into the board-end connector, the two side portions respectively enter into the two gaps.

* * * * *